United States Patent
Ogata et al.

(10) Patent No.: US 7,202,892 B1
(45) Date of Patent: Apr. 10, 2007

(54) IMAGE PICKUP METHOD AND APPARATUS, AND IMAGE PROCESSING METHOD AND APPARATUS FOR ADAPTING TO SYNTHESIZE A PLURALITY OF IMAGES

(75) Inventors: Masami Ogata, Kanagawa (JP); Takashi Tsuchiya, Tokyo (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/468,053

(22) Filed: Dec. 20, 1999

(30) Foreign Application Priority Data

Dec. 21, 1998 (JP) ................................ 10-362899

(51) Int. Cl.
*H04N 5/235* (2006.01)
*G03B 7/00* (2006.01)

(52) U.S. Cl. .................................... 348/229.1; 348/362

(58) Field of Classification Search .. 348/227.1–230.1, 348/298–299, 362, 370–371
See application file for complete search history.

(56) References Cited

U.S. PATENT DOCUMENTS

| 4,757,386 | A  | * | 7/1988 | Sanner ........................ 348/257 |
| 6,219,097 | B1 | * | 4/2001 | Kamishima et al. ........ 348/297 |
| 6,278,490 | B1 | * | 8/2001 | Fukuda et al. .............. 348/362 |
| 6,677,992 | B1 | * | 1/2004 | Matsumoto et al. ..... 348/229.1 |

FOREIGN PATENT DOCUMENTS

| JP | 05-167889 | * | 7/1993 |
| JP | 06-319419 | * | 11/1994 |
| JP | H07-095564 | A | 4/1995 |
| JP | H08-018959 | A | 1/1996 |
| JP | H11-177989 | A | 7/1999 |
| JP | 2000-138938 | A | 5/2000 |

OTHER PUBLICATIONS

Patent Abstract of Japan, "Image Composite Method and Image Composite Device," JP8154201, Jun. 11, 1996.
Patent Abstract of Japan, "Method and Device for Compressing Dynamic Range of Picture," JP10294911, Nov. 4, 1998.
Patent Abstract of Europe, "Image Mixing Circuit," EP0823814 A3, Feb. 11, 1998.

* cited by examiner

*Primary Examiner*—Vivek Srivastava
*Assistant Examiner*—Kelly Jerabek
(74) *Attorney, Agent, or Firm*—Finnegan, Henderson, Farabow, Garrett & Dunner, L.L.P.

(57) ABSTRACT

In an image pickup apparatus, a level compensator compensates the level of an image xL (i, j) sensed by an image sensor by exposure for a long time on the basis of the exposure of the image to produce a compensated image xL' (i, j), while another level compensator compensates the level of an image xS (i, j) sensed by the image sensor by exposure for a short time on the basis of the exposure of the image to produce a compensated image xS' (i, j). The image pickup apparatus also includes an image synthesizer to synthesize these compensates images xL' (i, j) and xS' (i, j) to produce a single synthetic image x (i, j). A dynamic range compressor also included in the image pickup apparatus compresses the synthetic image x (i, j) to produce a compressed image y (i, j) for delivery to outside.

37 Claims, 25 Drawing Sheets

|    |    |    |    |
|----|----|----|----|
| Ye | Cy | Ye | Cy |
| Mg | G  | Mg | G  |
| Ye | Cy | Ye | Cy |
| G  | Mg | G  | Mg |

G : GREEN
Ye : YELLOW
Cy : CYAN
Mg : MAGENTA

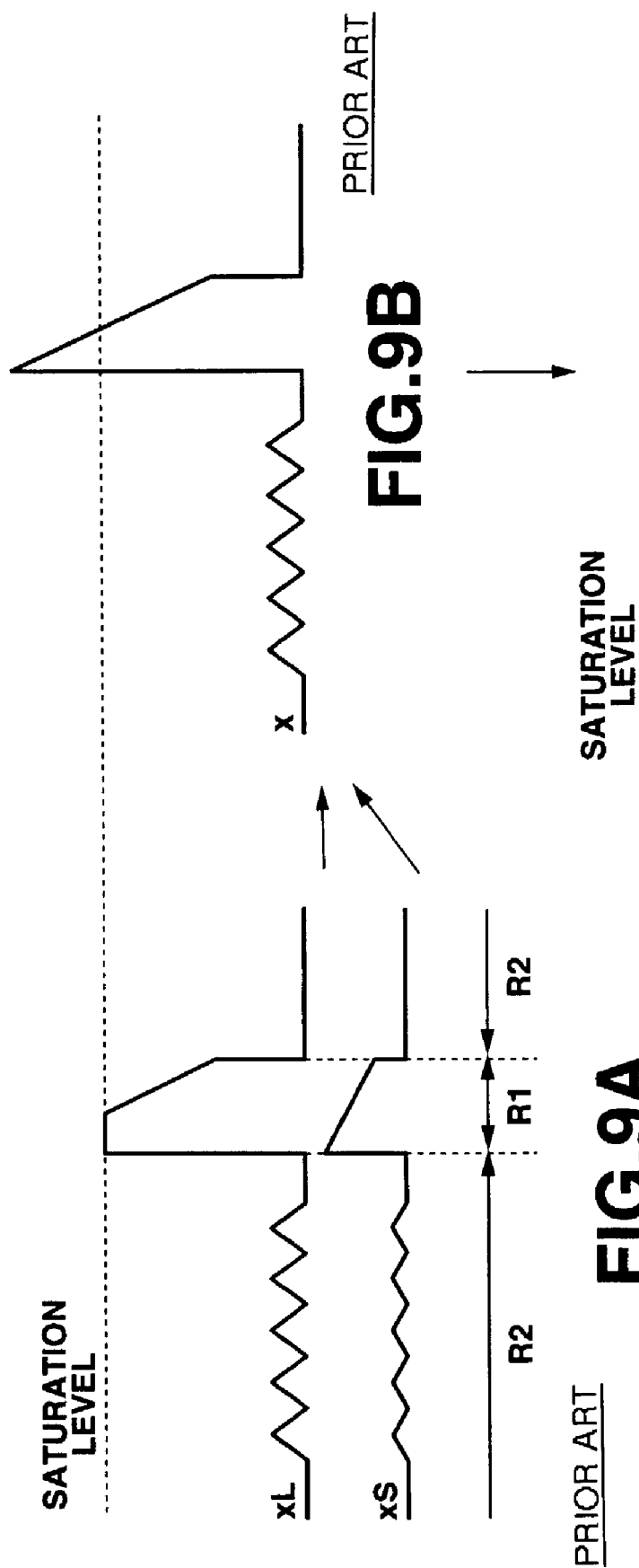

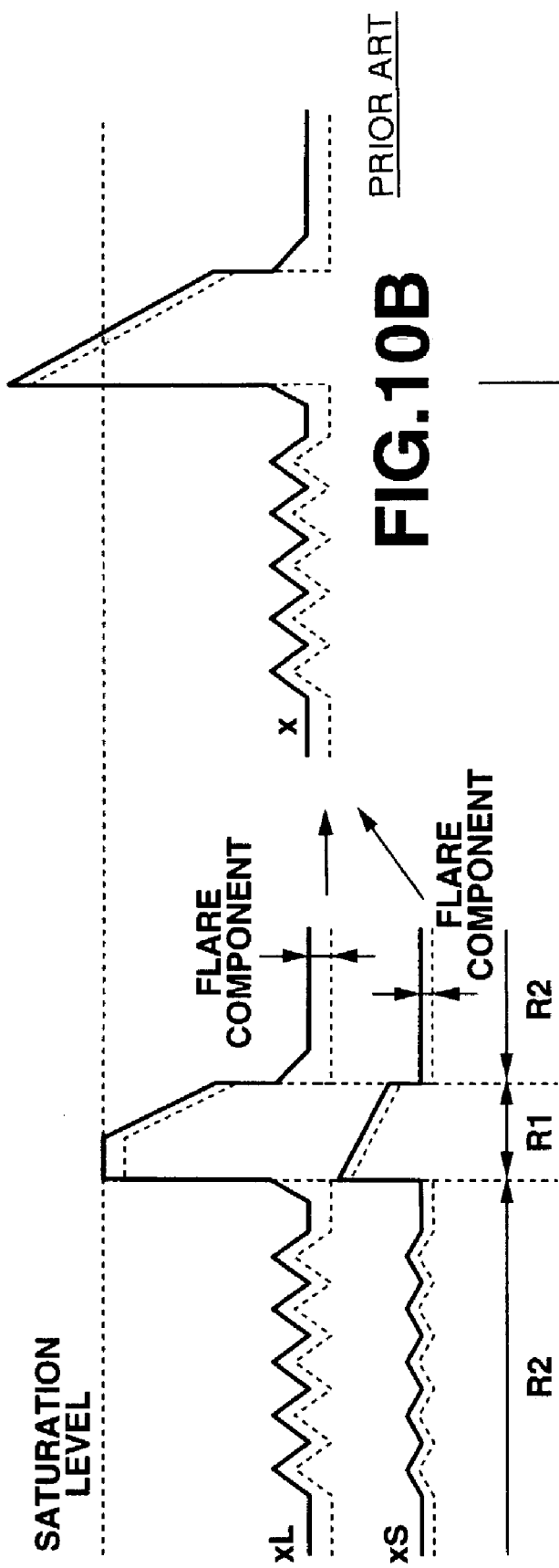
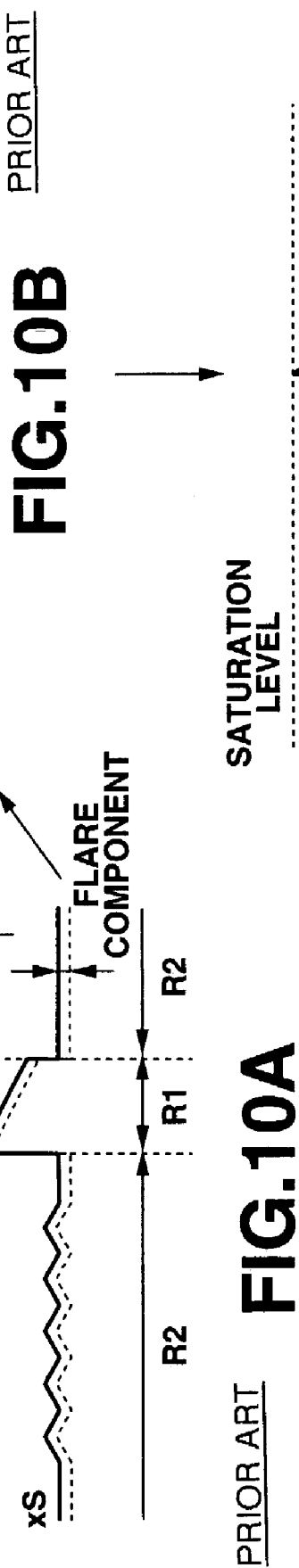
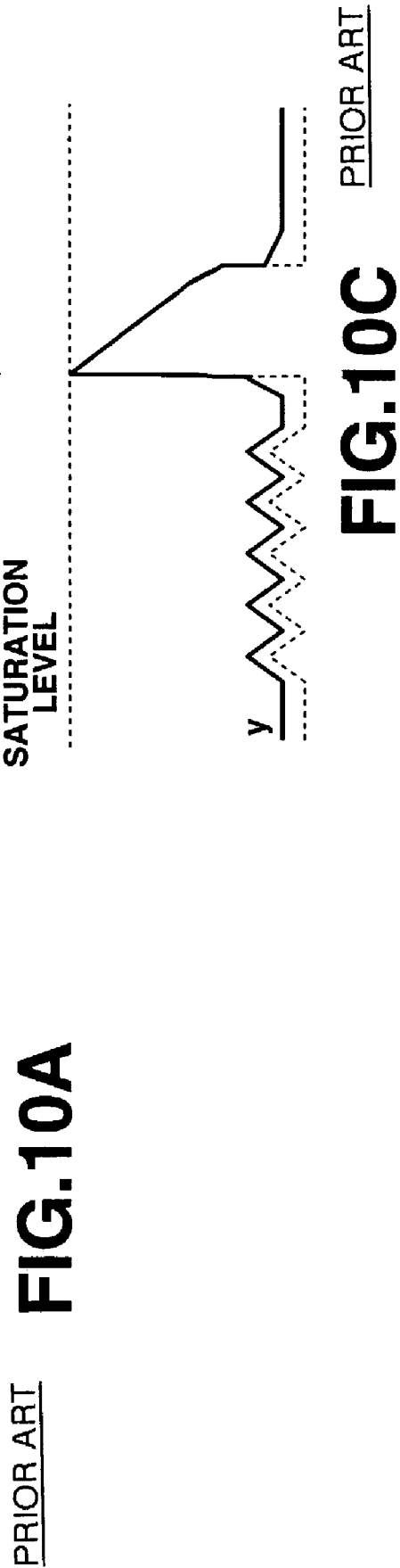
FIG.10A  PRIOR ART
FIG.10B  PRIOR ART
FIG.10C  PRIOR ART

IMAGE PICKUP METHOD AND APPARATUS, AND IMAGE PROCESSING METHOD AND APPARATUS FOR ADAPTING TO SYNTHESIZE A PLURALITY OF IMAGES

BACKGROUND OF THE INVENTION

1. Field of the Invention

The present invention relates to an image pickup method and apparatus, adapted to synthesize a plurality of images having been acquired by picking up or sensing an object under different exposure conditions, respectively, to produce an image having an excellent gradation reproducibility, and more particularly, to an image pickup method and apparatus suitable for application to a video camera, still camera, monitor camera, on-vehicle camera, etc. Also, the present invention relates to an image processing method and apparatus, adapted to receive a plurality of images different in exposure from each other, acquired under different exposure conditions, and synthesize the plurality of images to produce a synthetic image having an excellent gradation reproducibility.

2. Description of the Related Art

For acquisition of a plurality of images different in exposure from each other under different exposure conditions, various exposure control methods have so far been proposed. One typical example of them is a time-shared exposure control method in which a CCD (charge coupled device) is used as an image sensing device whose electronic shutter is used to change an exposure time to sense a plurality of images in a time-sharing manner. The principle of this time-shared exposure control method will be described with reference to FIG. 1. In FIG. 1, the horizontal axis indicates an elapsed time while the vertical axis indicates a charge storage in the image sensing device. This exposure control method is such that similarly to an ordinary image sensing, a charge is stored and read during a field interval and a following vertical blanking interval is utilized to store and read a charge again. This time-shared exposure control permits to provide two images different by one field interval in exposure time from each other.

Another typical example of the conventional exposure control methods for sensing a plurality of images different in exposure from each other is a space-shared exposure control method. This space-shared exposure control is shown in FIG. 2. As shown, this method is such that neutral density (ND) filters different in transmittance from each other are disposed on pixels, respectively, on image sensing devices to acquire a plurality of images with different exposures in a space-sharing manner. This space-shared exposure control also permits to provide a plurality of images different in exposure from each other.

A still another typical example of the exposure control methods of acquiring a plurality of images different in exposure from each other by sensing an object with different exposures is a method of controlling the exposure by multiple image sensing devices as shown in FIG. 3. As shown, this exposure control method is such that a plurality of image sensing devices is used and ND filters different in transmittance from each other are disposed on the incident faces of the image sensing devices, respectively, to sense a plurality of images. By controlling exposure with the aid of multiple image sensing devices, it is possible to provide a plurality of images different in exposure from each other without any reduction of spatial resolution of the images.

For synthesis of a plurality of images different in exposure from each other, it has been proposed to multiply each image by a factor corresponding to a ratio between the exposures of the images and then make a selection between the images on the basis of a threshold. The principle of this synthesis method will be described with reference to FIG. 4. In FIG. 4, the horizontal axis indicates incident quantities of light upon the image sensing device while the vertical axis indicates levels of output signals from the image sensing devices, that is, pixel levels of the sensed images. In FIG. 4, an image yL acquired by exposure for a long time is indicated with a straight line inclined a large angle, and in a region where the incident quantity of light is above a certain level, the level of output signal is constant because of the saturation of the image sensing devices. Also, an image yS acquired by exposure for a short time is indicated with a straight line inclined a small angle, and the output signal is saturated with the incident quantity of light being larger than that of the image yL. In this image synthesis method, first an output signal corresponding to the image yS acquired by exposure for the short time is multiplied by a factor g so that the inclination of the straight line indicating the image yS is made to coincide with that of the straight line indicating the image yL. Thereafter, reference is made to an output signal corresponding to the image yL. When the level of the output signal is higher than a threshold TH, the output signal corresponding to the image yL is selected. Also, reference is made to the output signal corresponding to the image yL. When the level of the output signal is higher than the threshold TH, the output signal corresponding to the image yS is selected. Thus, the plurality of images different in exposure from each other is synthesized to produce a synthetic image. Suppose here that the level of the output signal corresponding to the synthetic image is y'. Then, the image synthesis is given by the following equation (1):

$$y' = \begin{cases} yL & \ldots \ yL \leq TH \\ yS \times g & \ldots \ yL > TH \end{cases} \quad (1)$$

The factor g by which the output signal corresponding to the image yS is multiplied is a ratio between exposure times of the images, and it is given by the following equation (2):

$$g = \frac{T_{long}}{T_{short}} \quad (2)$$

where $T_{long}$ and $T_{short}$ indicate a long exposure time and a short exposure time, respectively. When the exposure time ratio is N times larger, the dynamic range of the synthetic image will be multiplied by N.

Note that when there are images having been acquired with more three kinds of exposure time, the image synthesis given by the equation (1) should be done first for an image whose exposure time is the longest, then for an image whose exposure time is the next longest, and so forth.

In the above, the synthesis of images whose exposure is controlled by changing the exposure time, has been described with reference to FIG. 1. Also, an image can be produced in the similar manner by synthesizing images acquired with their exposure controlled by the method shown in FIG. 2 or 3.

For compressing a synthetic image produced as in the above and which has a wide dynamic range to an extent depending upon the capability of a transmission system or display apparatus which will output the image, there has been proposed a method of converting the level of each pixel of an input image using a level conversion function having an input vs. output relation shown in FIG. 5. This compression will be referred to as "level conversion" hereinafter. In FIG. 5, the horizontal axis of the level conversion function indicates a pixel level 1 of an input image while the vertical axis indicates a pixel level T(1) of an output image having been converted in level. Also in FIG. 5, Linmax indicates a maximum level each pixel of the input image can take, Loutmax indicates a maximum level each pixel of the output image can take. In this level conversion, the whole dynamic range is compressed with sufficient contrasts secured at low and middle input levels, respectively, at the cost of a contrast at a high input level which is higher than 1 k, for example.

In addition to the above image compression, there has also been proposed an image compressing method in which the level conversion function is varied adaptively correspondingly to a frequency distribution of pixel level of an input image. As an example of this method, there is available a method called "histogram equalization". The principle of this histogram equalization will be described with reference to FIG. 6. In FIG. 6, the horizontal axis indicates an image level 1 of input image while the vertical axis indicates a frequency of pixel level of the input image. Also, Fmax in FIG. 6 indicates a maximum cumulative frequency of pixel level of the input image, which is a total number of pixels for used to calculate a frequency.

In this image compression method, first a frequency distribution H(1) of the pixel level 1 of an input image is produced, and then a cumulative frequency distribution C(1) is produced using the following equation (3):

$$C(l) = \sum_{k=0}^{l} H(k) \tag{3}$$

In this image compression method, the following equation (4) is used to normalize the cumulative frequency distribution C(1) to a range of level the output image can take to provide a level conversion function T(1). Using the level conversion function T(1), the image compression method permits to secure a sufficient contrast in a region defined by a pixel level whose output frequency is high, namely, a region having a large area, thereby compressing the whole dynamic range.

$$T(l) = \frac{C(l)}{F \max} \times L \max \tag{4}$$

In case a color filter having a color layout as shown in FIG. 7 for example is disposed on the front of an image sensing device to sense or pick up a color image, the image sensing device will provide an output signal in which a frequency-modulated color signal is superposed on a brightness signal as shown in FIG. 8. A method of synthesizing a plurality of color images sensed by such an image sensing device to produce a synthetic image and compressing the synthetic image, will be described herebelow.

In this method, an image signal sensed with each exposure is separated into a brightness signal and color signal on the basis of the following equation (5):

$$y = LPF_y(x) \tag{5}$$

$$c = LPF_c(v_i \times x)$$

$$v_i = \begin{cases} 1 & \ldots \ i : \text{even} \\ -1 & \ldots \ i : \text{odd} \end{cases}$$

where x indicates an image signal in which a brightness signal and a color signal are mixed together, c indicates a separated color signal, $LPF_y$ indicates a low-pass filter to separate the brightness signal, and $LPF_c$ indicates a low-pass filter to separate the color signal.

The separated brightness signal y is produced by synthesis and compressed by any of the above methods. On the other hand, the separated color signal c is produced by synthesis on the basis of the following equation (6) with reference to the size of a brightness signal acquired with a large exposure:

$$c' = \begin{cases} cL & \ldots \ yL \leq TH \\ cS \times g & \ldots \ yL > TH \end{cases} \tag{6}$$

where yL and cL indicate brightness and color signals acquired with large exposures, cS indicates a color signal acquired with a small exposure, and g indicates a ratio between exposures as shown in the aforementioned equation (2).

The synthetic color signal is compressed on the basis of the following equation (7) in such a manner as not to vary in exposure ratio relative to the brightness signal:

$$c''(i, j) = \frac{y''(i, j)}{y'(i, j)} \times c'(i, j) \tag{7}$$

An image xL acquired by exposure for a long time in an optimum condition, and an image xS acquired by exposure for a short time also in an optimum condition, are shown in FIG. 9A for example. As shown, the image xL acquired by exposure for the long time has a sufficient contrast in a low-level region R2 but its level is saturated in a high-level region R1. On the other hand, in the image xS acquired by exposure for the short time, the saturation level is not reached even in the high-level region R1 but no sufficient contrast cannot be secured in the low-level region R2.

For synthesis of two such images xL and xS and compression of a synthetic image thus produced, first the above-mentioned synthesis method is applied to synthesize, as shown in FIG. 9B the image xL itself acquired by exposure for the long time and selected in the low-level region R2, and a product resulted from multiplication of an exposure time ratio as given by the equation (2) by the image xS acquired by exposure for the short time and selected in the high-level region R1. The synthetic image thus obtained is compressed by the method shown in FIG. 5 for example, to produce an image y having a sufficient contrast in each of light and dark regions thereof as shown in FIG. 9C.

An image signal sensed in practice contains additional components developed due to a light diffraction at the boundary of an object to be sensed and a light reflection and scattering in the optical system. Thus, the sensed image has an increased level in the entirety thereof or in a dark region thereof adjacent to a light region, so there will result in an impression that the black level will be increased, as shown in FIG. 10A.

The above phenomenon is called "flare". An image sensed by exposure for a longer time will contain more flare spots. By synthesizing images containing such flare spots by the aforementioned method, a resultant image will be as shown in FIG. 10B. Since in the image synthesis, an image sensed by exposure for a short time will be amplified, a synthetic image produced by synthesis of such images will have flare spots nearly evenly distributed in the entirety thereof. For compressing the synthetic image by the aforementioned compression method, normally the higher level region of the image will be compressed more as shown in FIG. 5 for example, so that the compressed image will have more flare spots in the dark region thereof than in the light region as shown in FIG. 10C, thus the black level will be emphasized more.

Needless to say, such a phenomenon will take place in a plurality of images acquired by controlling the exposure time as having been described with reference to FIG. 1 as well as in images acquired by any other exposure control method having previously been described with reference to FIG. 2 or 3.

As having been described in the foregoing, the conventional image pickup methods including the aforementioned exposure control method, image synthesis method and image compression method are disadvantageous in that synthetic images and compressed images are not natural because a plurality of original images to be synthesized are acquired in different conditions, respectively.

The conventional image pickup methods are also disadvantageous in that since images acquired with larger exposure contain more flare spots, an image produced by synthesis of such sensed images has the level in the dark region thereof relatively increased as caused by the flare spots and thus a resultant image as a whole will be whitish.

OBJECT AND SUMMARY OF THE INVENTION

It is therefore an object of the present invention to overcome the above-mentioned drawbacks of the prior art by providing an image pickup method of producing a more natural image.

It is another object to provide an image pickup apparatus which implements the image pickup method.

It is further object to overcome the above-mentioned drawbacks of the prior by providing an image processing method adapted to receive a plurality of images sensed in different exposure conditions, respectively, synthesize the input images and compress a synthetic image thus produced, to thereby produce a more natural image.

It is a still another object to provide an image processing apparatus which implements the image processing method.

The above object can be attained by providing an image pickup method of synthesizing a plurality of images acquired by sensing an object under different exposure conditions to produce a single image excellent in gradation reproducibility, the method including, according to the present invention, the steps of:

sensing an object under different exposure conditions to acquire a plurality of images;

compensating the levels of the plurality of images on the basis of the exposure conditions under which they have been sensed respectively, to provide a plurality of compensated images;

synthesizing the plurality of compensated images to produce a single synthetic image having a wide dynamic range; and compressing the synthetic image to an extent depending upon the performance of its output destination to produce a compressed image.

In the above image pickup method according to the present invention, the plurality of compensated images produced at the step of image level compensation is synthesized and the synthetic image thus produced is compressed to produce a single compressed image.

Also the above object can be attained by providing an image pickup method of synthesizing a plurality of images acquired by sensing an object under different exposure conditions to produce a single image excellent in gradation reproducibility, the method including, according to the present invention, the steps of:

sensing an object under different exposure conditions to acquire a plurality of images;

synthesizing the plurality of compensated images to produce a single synthetic image having a wide dynamic range;

compressing the dynamic range of the synthetic image to an extent depending upon the performance of its output destination to produce a compressed image; and compensating the level of the compressed image to provide a compensated compressed image.

In the above image pickup method according to the present invention, the compressed image produced through the synthesis of the plurality of images and compression of the synthetic image thus obtained is compensated to produce a single compensated compressed image.

Also the above object can be attained by providing an image pickup apparatus adapted to produce a single image excellent in gradation reproducibility from a plurality of images acquired by sensing an object under different exposure conditions, the apparatus including according to the present invention:

means for sensing an object under different exposure conditions to acquire a plurality of images;

means for compensating the levels of the plurality of images on the basis of the exposure conditions under which they have been sensed respectively, to provide a plurality of compensated images;

means for synthesizing the plurality of compensated images to produce a single synthetic image having a wide dynamic range; and means for compressing the synthetic image to an extent depending upon the performance of its output destination to produce a compressed image.

The above image pickup apparatus according to the present invention synthesizes the plurality of compensated images produced by the level compensating means and compresses the synthetic image thus obtained to produce a single compressed image.

Also the above object can be attained by providing an image pickup apparatus adapted to synthesize a plurality of images acquired by sensing an object under different exposure conditions to produce a single image excellent in gradation reproducibility, the apparatus including according to the present invention:

means for sensing an object under different exposure conditions to acquire a plurality of images;

means for synthesizing the plurality of compensated images to produce a single synthetic image having a wide dynamic range;

means for compressing the dynamic range of the synthetic image to an extent depending upon the performance of its output destination to produce a compressed image; and means for compensating the level of the compressed image to provide a compensated compressed image.

The above image pickup apparatus according to the present invention compensates the compressed image produced through the synthesis of the plurality of images and compression of the synthetic image thus obtained to produce a single compensated compressed image.

Also the above object can be attained by providing an image processing method of synthesizing a plurality of images acquired by sensing an object under different exposure conditions to produce a single image excellent in gradation reproducibility, the method including, according to the present invention, the steps of:

sensing an object under different exposure conditions to acquire a plurality of images;

compensating the levels of the plurality of images on the basis of the exposure conditions under which they have been sensed respectively, to provide a plurality of compensated images;

synthesizing the plurality of compensated images to produce a single synthetic image having a wide dynamic range; and compressing the synthetic image to an extent depending upon the performance of its output destination to produce a compressed image.

In the above image processing method according to the present invention, the plurality of compensated images produced at the step of image level compensation is synthesized and the synthetic image thus produced is compressed to produce a single compressed image.

Also the above object can be attained by providing an image processing method of synthesizing a plurality of images acquired by sensing an object under different exposure conditions to produce a single image excellent in gradation reproducibility, the method including, according to the present invention, the steps of:

sensing an object under different exposure conditions to acquire a plurality of images;

synthesizing the plurality of compensated images to produce a single synthetic image having a wide dynamic range;

compressing the dynamic range of the synthetic image to an extent depending upon the performance of its output destination to produce a compressed image; and compensating the level of the compressed image to provide a compensated compressed image.

In the above image processing method according to the present invention, the compressed image produced through the synthesis of the plurality of images and compression of the synthetic image thus obtained is compensated to produce a single compensated compressed image.

Also the above object can be attained by providing an image processing apparatus adapted to produce a single image excellent in gradation reproducibility from a plurality of images acquired by sensing an object under different exposure conditions, the apparatus including:

means for sensing an object under different exposure conditions to acquire a plurality of images;

means for compensating the levels of the plurality of images on the basis of the exposure conditions under which they have been sensed respectively, to provide a plurality of compensated images;

means for synthesizing the plurality of compensated images to produce a single synthetic image having a wide dynamic range; and means for compressing the synthetic image to an extent depending upon the performance of its output destination to produce a compressed image.

The above image processing apparatus according to the present invention synthesizes the plurality of compensated images produced by the level compensating means and compresses the synthetic image thus obtained to produce a single compressed image.

Also the above object can be attained by providing an image processing apparatus adapted to synthesize a plurality of images acquired by sensing an object under different exposure conditions to produce a single image excellent in gradation reproducibility, the apparatus including:

means for sensing an object under different exposure conditions to acquire a plurality of images;

means for synthesizing the plurality of compensated images to produce a single synthetic image having a wide dynamic range;

means for compressing the dynamic range of the synthetic image to an extent depending upon the performance of its output destination to produce a compressed image; and means for compensating the level of the compressed image to provide a compensated compressed image.

The above image processing apparatus according to the present invention compensates, by the level compensating means, the compressed image produced through the synthesis of the plurality of images and compression of the synthetic image thus obtained to produce a single compensated compressed image.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIG. 9 shows a series of image processing operations made on an image signal having been sensed in an ideal exposure condition;

FIG. 10 shows a series of image processing operations made on an image signal having been sensed in a practical exposure condition;

DETAILED DESCRIPTION OF THE PREFERRED EMBODIMENTS

It should be noted that the embodiments of the image pickup apparatus according to the present invention, which will be described herebelow, implement the image pickup methods according to the present invention.

Figure 11:
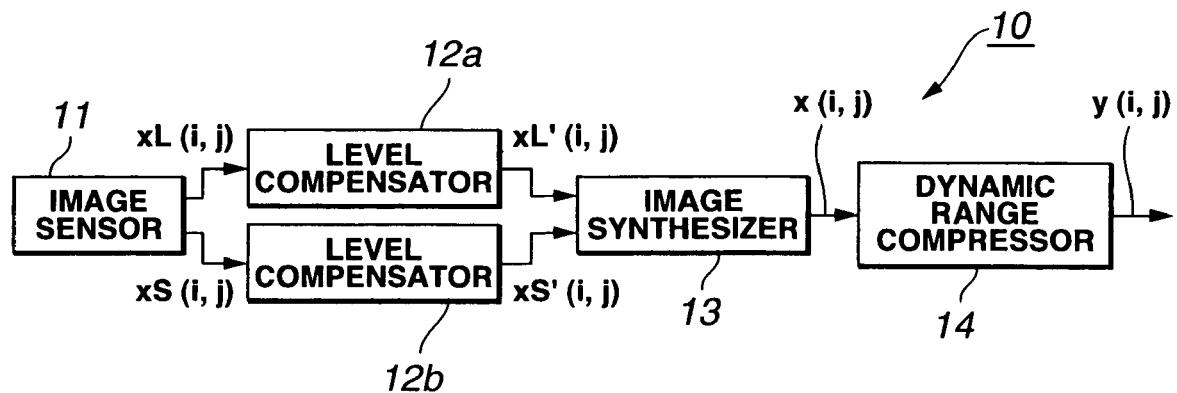
FIG. 11 is a schematic block diagram of a first embodiment of the image pickup apparatus according to the present invention.

Referring now to FIG. 11, there is schematically illustrated in the form of a block diagram the first embodiment of the image pickup apparatus according to the present invention. The image pickup apparatus is generally indicated with a reference 10, and it includes an image sensor 11, level compensators 12a and 10b, an image synthesizer 13, and a dynamic range compressor 14.

Figure 12:
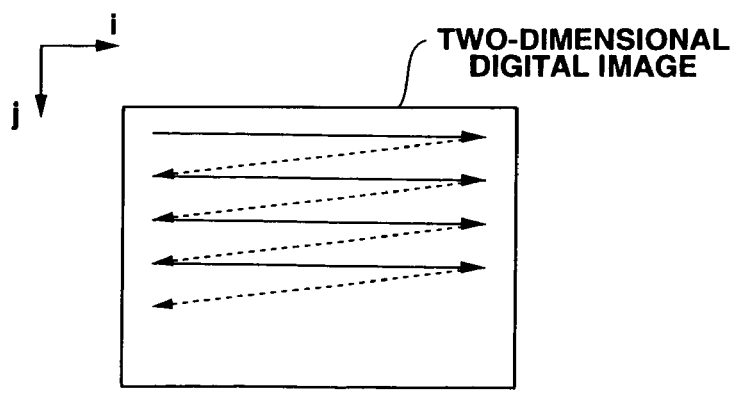
FIG. 12 shows an image scanning direction.

Note that input signals to various blocks of the image pickup apparatus 10 are time-series data of pixels acquired by scanning a two-dimensional digital image horizontally and then vertically and a pixel corresponding to a position (i, j) on the image is represented as p (i, j), as shown in FIG. 12.

The image sensor 11 shown in FIG. 11 has an image sensing device (not shown) such as CCD and an electronic shutter used to control the exposure. Thus, the image sensor 11 outputs a plurality of image signals sensed by exposure for a long time. The image sensor 11 provides as an output a long-time exposure image xL (i, j) sensed by exposure for a long time to the level compensator 12a provided downstream thereof, and a short-time exposure image xS (i, j) sensed by exposure for a short time to the level compensator 12b provided also downstream thereof.

Figure 13:
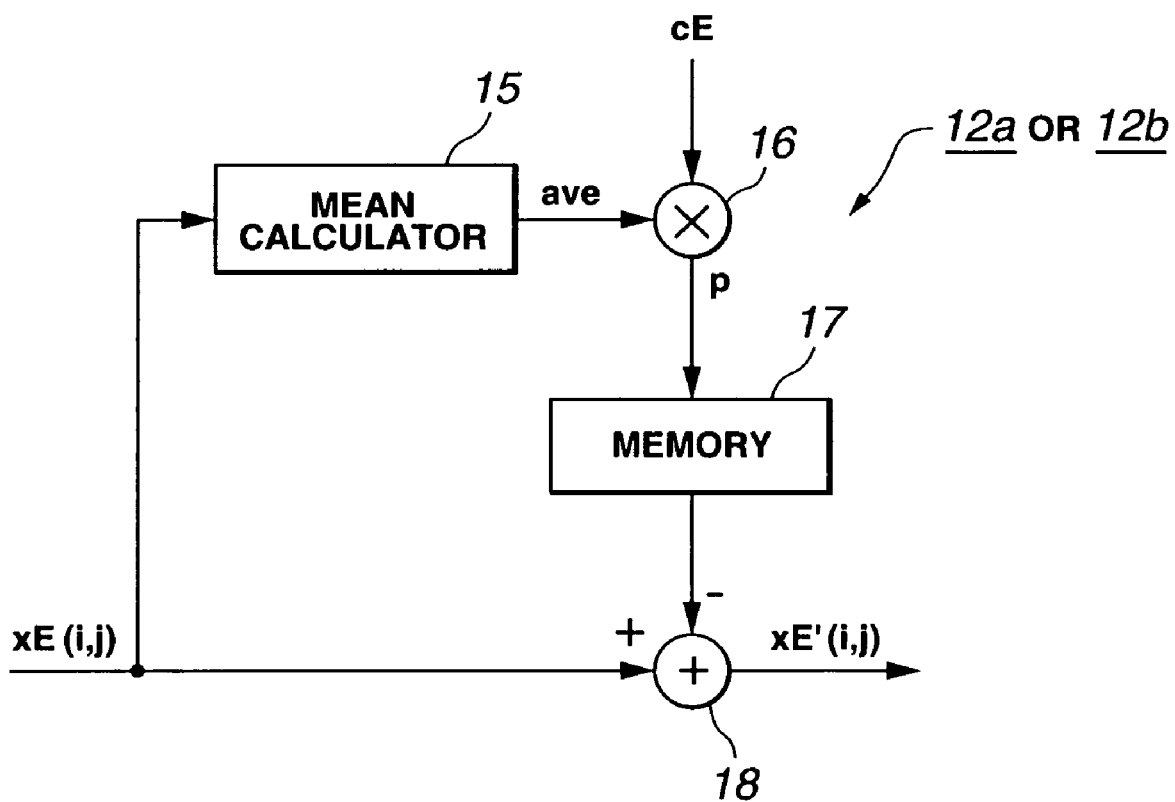
FIG. 13 is a schematic block diagram of the level compensator provided in the image pickup apparatus in FIG. 11.

The level compensator 12a and 12b are provided to compensate the levels of such images acquired by exposure for different times as will be described later. As shown in FIG. 13, each of the level compensators 12a and 12b includes a mean calculator 15 to calculate a mean level ave of an input image, a multiplier 16 to multiply the mean level ave calculated by the mean calculator 15 by a preset factor cE, a memory 17 to hold an amount of compensation p calculated by the multiplier 16, and a subtractor 18 to subtract the compensation amount p from an input signal xE (i, j). The level compensator 12a is supplied with the long-time exposure image xL (i, j) and compensates the level of this input image to produce a compensated image xL' (i, j). Also the level compensator 12b is supplied with the short-time exposure image xS (i, j) and compensates the level of this input image to produce a compensated image xS' (i, j).

The image synthesizer 13 synthesizes the two compensated images xL' (i, j) and xS' (i, j) whose levels have been compensated by the level compensators 12a and 12b, to produce a single synthetic image x (i, j) having a wide dynamic range.

The dynamic range compressor 14 is provided to compress the dynamic range of the synthetic image signal x (i, j) to an extent depending upon the capabilities of the output transmission system, display apparatus, recorder, etc. to produce a compressed image y (i, j) for delivery to outside.

Figure 14:
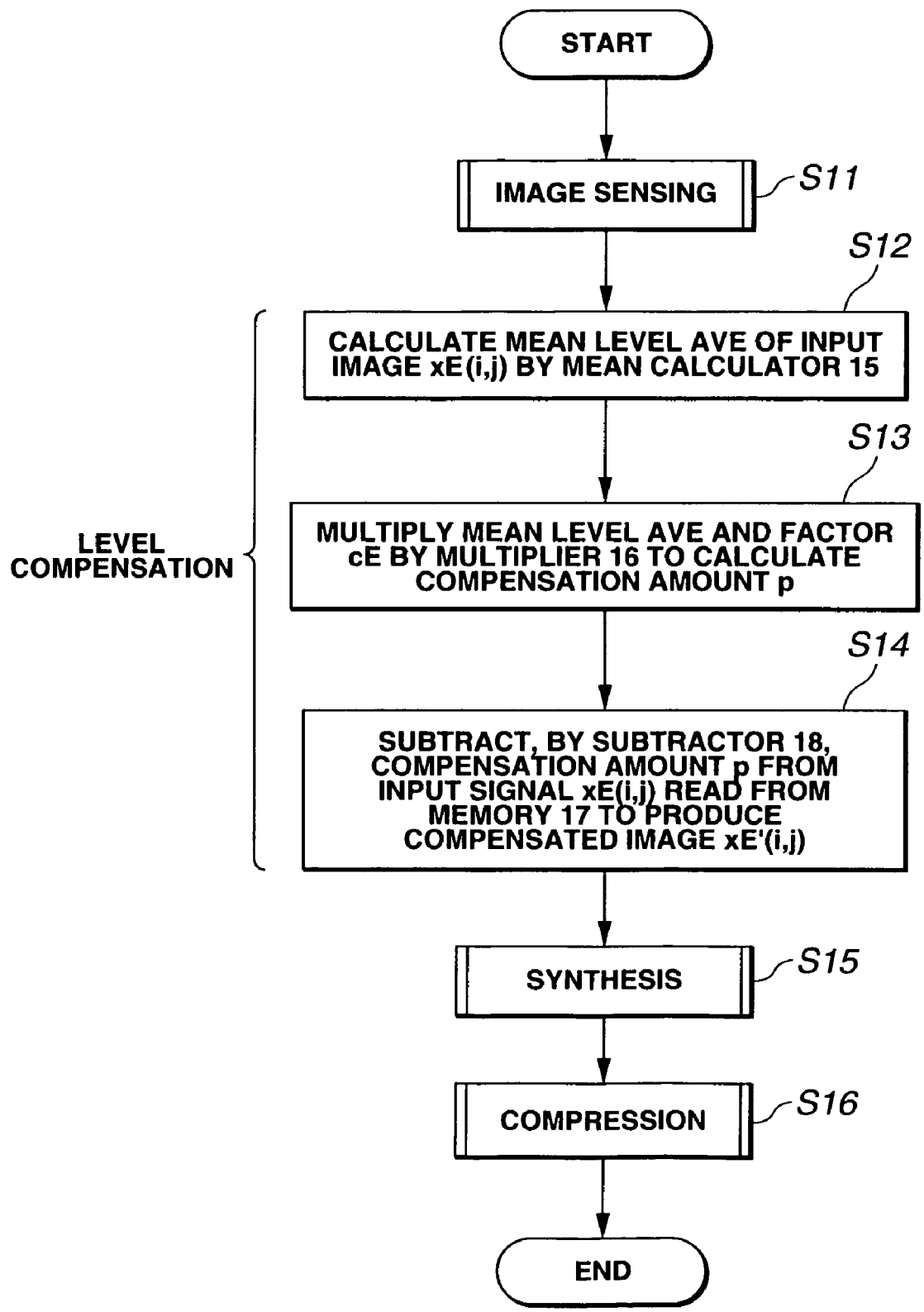
FIG. 14 is a flow chart of a series of operations effected in the image pickup apparatus in FIG. 11.

The image pickup apparatus 10 having the above-mentioned construction effects a series of operations as shown in FIG. 14.

First at step S11 in FIG. 14, the image pickup apparatus 10 produces a long-time exposure image xL (i, j) and a short-time exposure image xS (i, j) with the aid of the image sensor 11 and provides them to the level compensators 12a and 12b, respectively.

Next at steps S12 to S14, the image pickup apparatus 10 will compensate the image levels.

That is, at step S12, the mean calculator 15 in the image pickup apparatus 10 calculates a mean level ave of each of the two images xL (i, j) and xS (i, j) supplied to the level compensators 12a and 12b, respectively, from the image sensor 11, and sends them to the multiplier 16. Note that the image xE (i, j) supplied to the level compensators 12a and 12b from the image sensor 11 is supplied to the subtractor 18 as well.

Next at step S13, the multiplier 16 in the image pickup apparatus 10 multiplies the mean level ave calculated by the mean calculator 15 by the preset factor cE and sends the resultant product as the compensation amount p to the memory 17. In this embodiment, the factor cE indicates either a factor cL for the long-time exposure image xL (i, j)

or a factor cS for the short-time exposure image xS (i, j) and has a value above 0 and below 1. The factor cE is previously set according to the exposure condition under which an image to be compensated has been sensed. Namely, a larger value is set as the factor for an image sensed by exposure for a longer time.

At step S14, the subtractor 18 in the image pickup apparatus 10 reads, synchronously with an input pixel, the compensation amount p from the memory 17, and compensates the image level by subtracting the compensation amount p from the input signal xE (i, j) to produce a compensated image xE' (i, j).

Thus in the image pickup apparatus 10, the level compensators 12a and 12b compensate the levels all the plurality of images sensed with different exposures, respectively, that is, the long- and short-time exposure images xL (i, j) and xS (i, j) in this embodiment, to produce two compensated images xL' (i, j) and xS' (i, j), respectively.

Further at step S15, the image synthesizer 13 in the image pickup apparatus 10 synthesizes the images. Namely, in the image pickup apparatus 10, the two compensated images xL' (i, j) and xS' (i, j) from the level compensators 12a and 12b, respectively, are supplied to the image synthesizer 13 at step S15. The image synthesizer 13 synthesizes these images to produce a single synthetic image x (i, j) having a wide dynamic range.

Then at step S16, the dynamic range compressor 14 in the image pickup apparatus 10 compresses the synthetic image x (i, j) to an extent depending upon the status and capability of the output destination to produce a compressed image y (i, j). Here the series of operation is over.

As in the above, the image pickup apparatus 10 is adapted such that the factor cE is set longer for the image whose exposure time is longer. Namely, since the compensation amount p is larger for an input image xE (i, j) whose exposure time is longer, the pixel level of the compensated image xE' (i, j) is lower. Therefore, in the image pickup apparatus 10, the input image xE (i, j) is not synthesized and compressed as it is but the compensated image xE' (i, j) is synthesized and compressed, so that flare spots or components contained in each image are well balanced. Thus, an image processing is possible with less influence by the flare components to produce synthesized and compressed images appearing more natural.

Note that although the image pickup apparatus 10 includes the two level compensators 12a and 12b to compensate the levels of the long- and short-time exposure images xL (i, j) and xS (i, j), respectively, the level compensator 12b may be omitted by setting a compensation amount p of zero for the short-time exposure image xS (i, j).

As in the above, the mean calculator 15 in the image pickup apparatus 10 calculates a mean level of an entire image. However, the image pickup apparatus 10 may be adapted to calculate a mean level of pixels within a freely selected area of the image by the mean calculator 15.

Further, the image pickup apparatus 10 may be adapted such that a certain range of pixel level is set taking in consideration an exposure time of an input image to each of the level compensators 12a and 12b and the mean calculator 15 calculates a mean value of only pixels falling in the pixel level range.

Further, the image pickup apparatus 10 may be applied to a dynamic image. In this image pickup apparatus 10, since a time for at least one image is required for the mean calculator 15 to calculate a mean value, there will be a time gap for one image between a calculated compensation amount p and an image signal xE (i, j) to be compensated.

Figure 15:
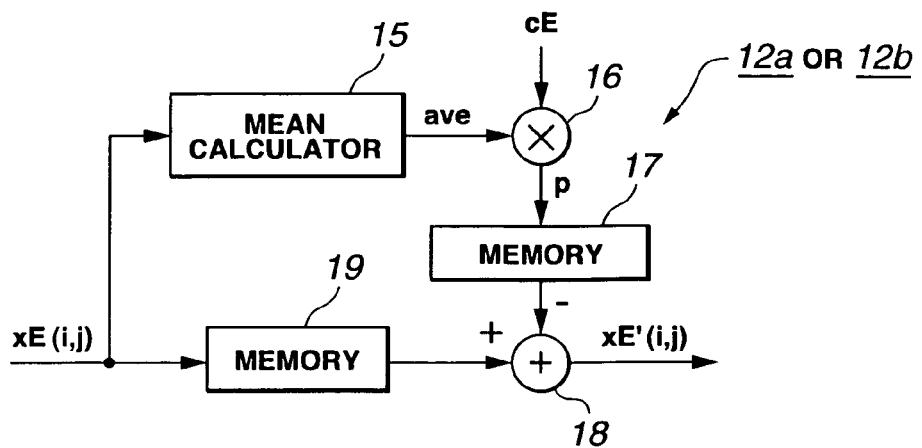
FIG. 15 is a schematic block diagram of a variant of the level compensator provided in the image pickup apparatus in FIG. 11.

For an accurate correspondence between the compensation amount p and to-be-compensated image signal xE (i, j), a memory 19 may be provided in the image pickup apparatus 10 upstream of the subtractor 18, as shown in FIG. 15 for example, to hold a pixel value for one image of the to-be-compensated image signal xE (i, j).

Also, more than three level compensators (additional to the level compensators 12a and 12b) may be provided in the image pickup apparatus 10 to synthesize more than three images.

Moreover, the image pickup apparatus 10 may of course incorporate additionally in the image sensor 11 thereof ND filters, for example, different in transmittance from each other and provided on the image sensing devices (not shown), respectively, as a part of the image sensor 11 in order to synthesize and compress not only images acquired by exposure for different lengths of time, as having been described in the foregoing, but also images acquired by controlling the exposure in a space-shared manner and images acquired by controlling the exposure with the aid of multiple image sensing devices (not shown).

Furthermore, it is of course that the image sensor 11 may be followed by an image processor to process an input image signal from an external image sensor such as the image sensor 11. In this case, the input image signal may be equivalent to an image signal captured by a variety of cameras, for example. The input image signal may be a scanned image signal supplied a scanner or the like.

Next, the second embodiment of the image pickup apparatus according to the present invention will be described with reference to FIGS. 16 to 19.

Figure 16:
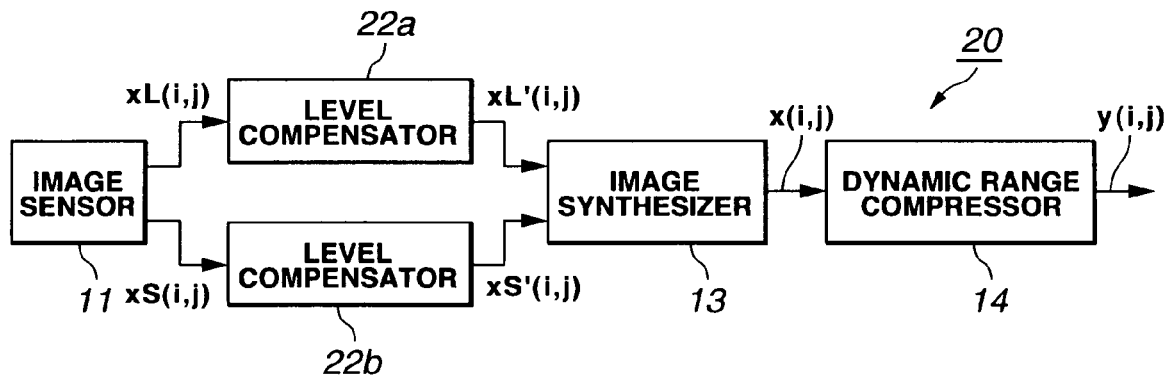
FIG. 16 is a schematic block diagram of a second embodiment of the image pickup apparatus according to the present invention.

Referring now to FIG. 16, there is schematically illustrated in the form of a block diagram the second embodiment of the image pickup apparatus according to the present invention. The image pickup apparatus is generally indicated with a reference 20. As shown in FIG. 16, the basic construction of the image pickup apparatus 20 is similar to that of the image pickup apparatus 10 having been described in the foregoing with reference to FIG. 11, except that level compensators 22a and 22b different in construction from each other are provided in place of the level compensators 12a and 12b in the image pickup apparatus 10. Therefore, in FIG. 16, the same and similar elements as those in FIG. 11 are indicated with the same and similar references as those in FIG. 11. Note that also this embodiment will be described hereinbelow supposing that input signals to various blocks of the image pickup apparatus 20 are time-series data of pixels acquired by scanning a two-dimensional digital image horizontally and then vertically and a pixel corresponding to a position (i, j) on the image is represented as p (i, j), as shown in FIG. 12.

As shown in FIG. 16, the image pickup apparatus 20 includes an image sensor 11, an image synthesizer 13, a dynamic range compression 14, and level compensators 22a and 22b.

Figure 17:
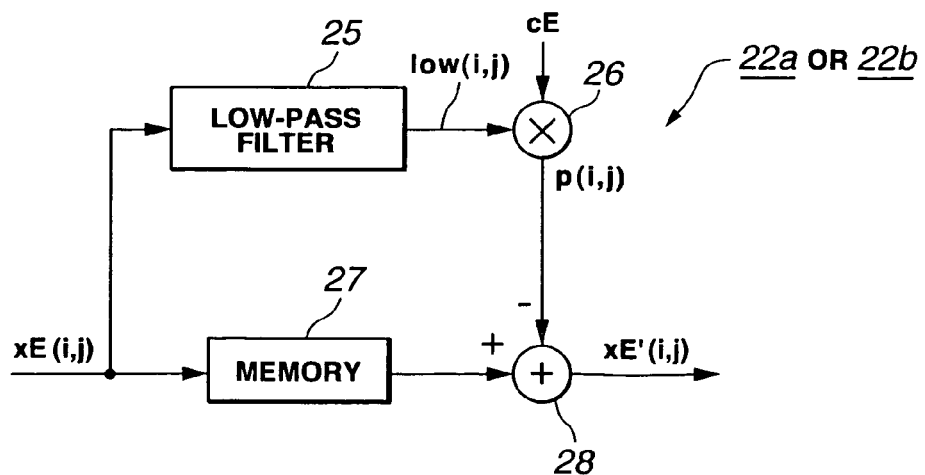
FIG. 17 is a schematic block diagram of the level compensator provided in the image pickup apparatus in FIG. 16.

Similarly to the level compensators 12a and 12b, the level compensators 22a and 22b compensate the levels of such images acquired by exposure for different times. As shown in FIG. 17, each of the level compensators 22a and 22b includes a low-pass filter 25, a multiplier 26 to multiply by a preset factor cE each pixel of a mean image low (i, j) produced by the low-pass filter 25, a memory 27 which will further be described later, and a subtractor 28 to subtract a compensation amount p (i, j) from an input signal xE (i, j). The level compensator 22a is supplied with the long-time exposure image xL (i, j) and compensates the level of this input image to produce a compensated image xL' (i, j). Also the level compensator 22b is supplied with the short-time exposure image xS (i, j) and compensates the level of this input image to produce a compensated image xS' (i, j).

The low-pass filter 25 is a mean value filter which provides a mean value as given by the following equation (8) to filter the input image xL (i, j) or xS (i, j) (they will be generically referred to as "image xE (i, j)" hereinafter) to produce a mean image low (i, j) indicative of a mean value of the image xE (i, j).

$$\text{low}(i, j) = \sum_{dj=-N/2}^{N/2} \sum_{di=-M/2}^{M/2} \frac{xE(i+di, j+dj)}{M \times N} \quad (8)$$

where N and M are constants indicative of near areas, respectively, to be calculated for a mean value.

The memory 27 serves as a buffer to delay the input image xE (i, j) for a necessary time for the low-pass filter 25 to filter the input image. Its capacity depends upon the size of a near area used in the filtering by the low-pass filter 25.

Figure 18:
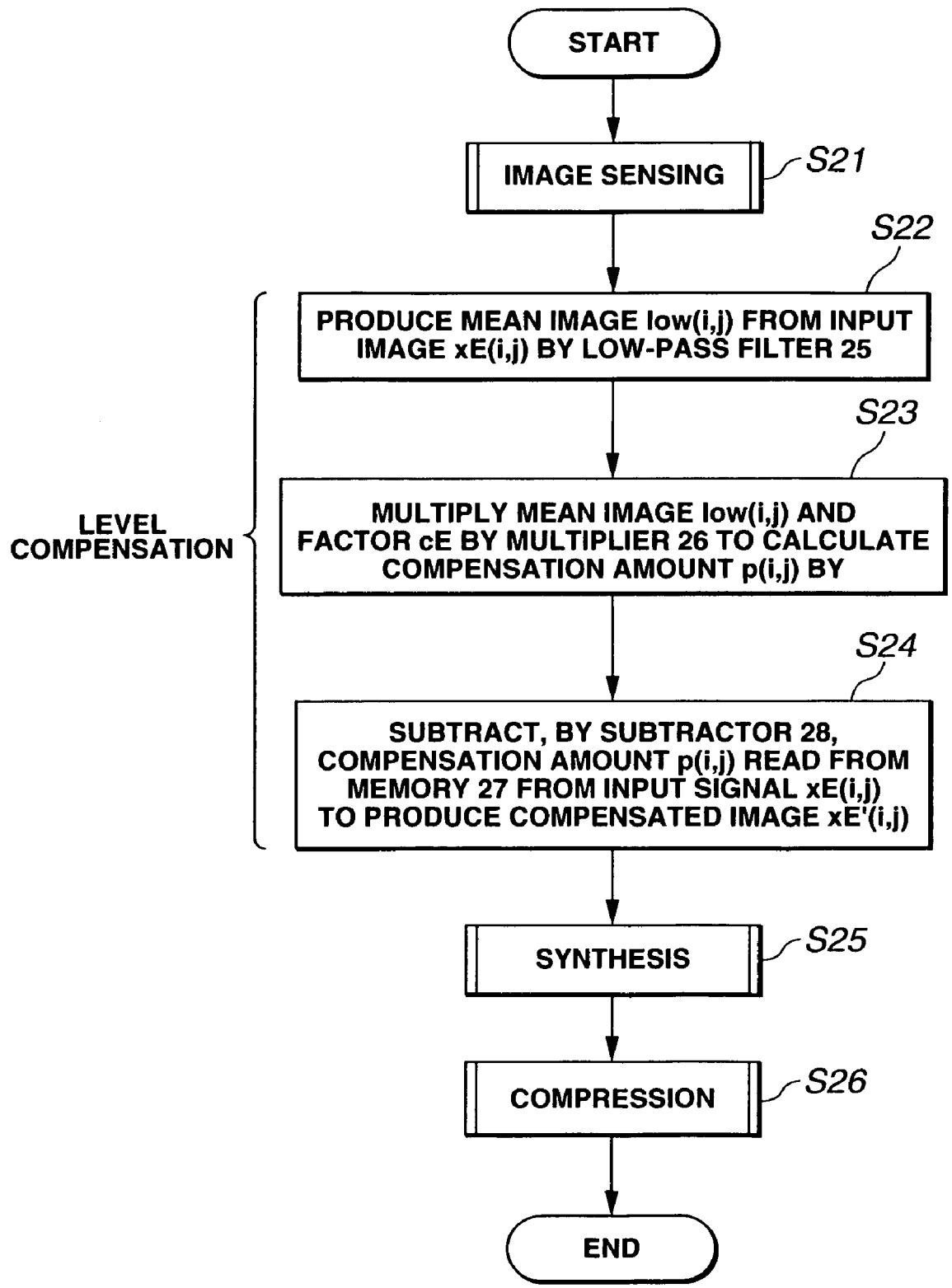
FIG. 18 is a flow chart of a series of operations effected in the image pickup apparatus in FIG. 16.

The image pickup apparatus 20 constructed as in the above effects a series of operations as shown in FIG. 18.

Figure 21:
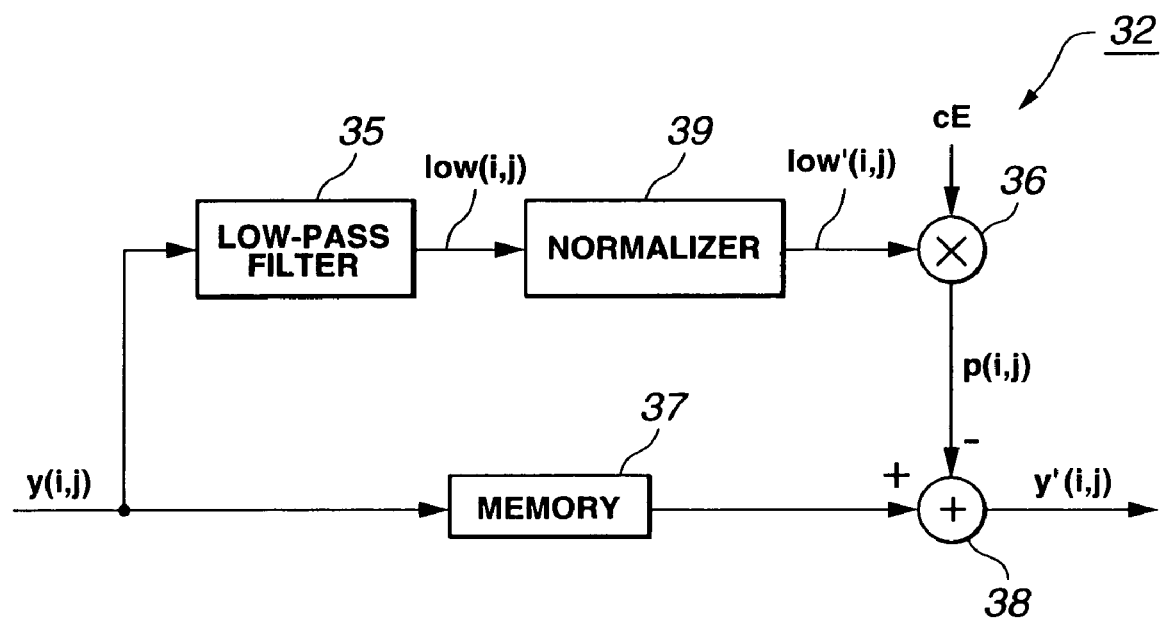
FIG. 21 is a schematic block diagram of the level compensator provided in the image pickup apparatus in FIG. 20.

First at step S18 in FIG. 21, the image pickup apparatus 20 produces a long-time exposure image xL (i, j) and a short-time exposure image xS (i, j) with the aid of the image sensor 11 and provides them to the level compensators 22a and 22b, respectively. Note that these images xL (i, j) and xS (i, j) are also supplied to the memory 27.

Next at steps S22 to S24, the image pickup apparatus 20 will compensate the image levels.

That is, at step S22, the low-pass filter 25 in the image pickup apparatus 20 filters the images xE (i, j) supplied to the level compensators 22a and 22b, respectively, from the image sensor 11 to produce a mean image low (i, j).

Next at step S23, the multiplier 26 in the image pickup apparatus 20 multiplies each of pixel of the mean image low (i, j) produced by the low-pass filter 25 by the preset factor cE to calculate a compensation amount p (i, j) for each pixel. Also in this embodiment, the factor cE indicates either a factor cL for the long-time exposure image xL (i, j) or a factor cS for the short-time exposure image xS (i, j) and has a value above 0 and below 1. Thus, the factor is set to have a larger value for an image sensed by exposure for a longer time.

At step S24, the subtractor 28 in the image pickup apparatus 20 simultaneously reads the compensation amount p (i, j) and the input signal xE (i, j) held in the memory 27, and compensates the image level by subtracting the compensation amount p (i, j) from the input signal xE (i, j) to produce a compensated image xE' (i, j).

Thus in the image pickup apparatus 20, the level compensators 22a and 22b compensate the levels of all the plurality of images sensed with different exposures, respectively, that is, the long- and short-time exposure images xL (i, j) and xS (i, j) in this embodiment, to produce two compensated images xL' (i, j) and xS' (i, j), respectively.

Further at step S25, the image synthesizer 13 in the image pickup apparatus 20 synthesizes the two compensated images xL' (i, j) and xS' (i, j) to produce a synthetic image x (i, j), and the at step S26, the dynamic range compressor 14 compresses the synthetic image x (i, j) to an extent depending upon the status and capability of the output destination to produce a compressed image y (i, j). Here the series of operation is over.

Thus in the image pickup apparatus 20, since a larger value is subtracted from a pixel of the input image xE (i, j) in the vicinity of which there exists a high level, it is possible to inhibit flare spots from developing in the vicinity of the high level area. Therefore, in the image pickup apparatus 20, the compensated image xE' (i, j) is synthesized and compressed to well balance the flare components included in each image. Thus, an image processing is possible with less influence by the flare components to produce synthesized and compressed images appearing more natural.

Figure 19:
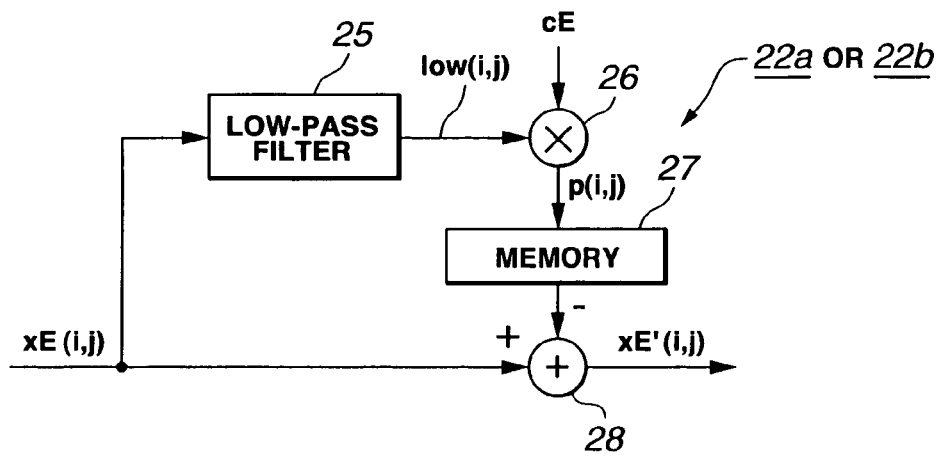
FIG. 19 is a schematic block diagram of a variant of the level compensator provided in the image pickup apparatus in FIG. 16.

Further, the image pickup apparatus 20 may be applied to a dynamic image. In this case, this image pickup apparatus 20 may be constructed to have the memory of the level compensators 22a and 22b provided between the multiplier 26 and subtractor 28 as shown in FIG. 19. In this image pickup apparatus 20, the compensation amount p (i, j) corresponding to each pixel of the input image xE (i, j) is held in the memory 27, and outputted to the subtractor 28 after a delay by a time for one image. Thus in the image pickup apparatus 20, the compensation amount p (i, j) will be delayed one image from the input signal xE (i, j). However, since a required number of bits for indication of each compensation amount is generally smaller than the number of bits for indication of pixels, in case a large near area is used for filtering by the low-pass filter 25, the memory 27 may be of a smaller capacity.

Also, more than three level compensators (additional to the level compensators 22a and 22b) may be provided in the image pickup apparatus 20 to synthesize more than three images.

Moreover, the image pickup apparatus 20 can of course synthesize and compress not only images acquired by exposure for different lengths of time but also images acquired by controlling the exposure in a space-shared manner, as having been described in the foregoing, and images acquired by controlling the exposure with the aid of multiple image sensing devices.

Furthermore, it is of course that the image sensor 11 may be followed by an image processor to process an input image signal from an external image sensor such as the image sensor 11. In this case, the input image signal may be equivalent to an image signal captured by a variety of cameras, for example. The input image signal may be a scanned image signal supplied a scanner or the like.

Next, the third embodiment of the image pickup apparatus according to the present invention will be described with reference to FIGS. 20 to 22.

Figure 20:
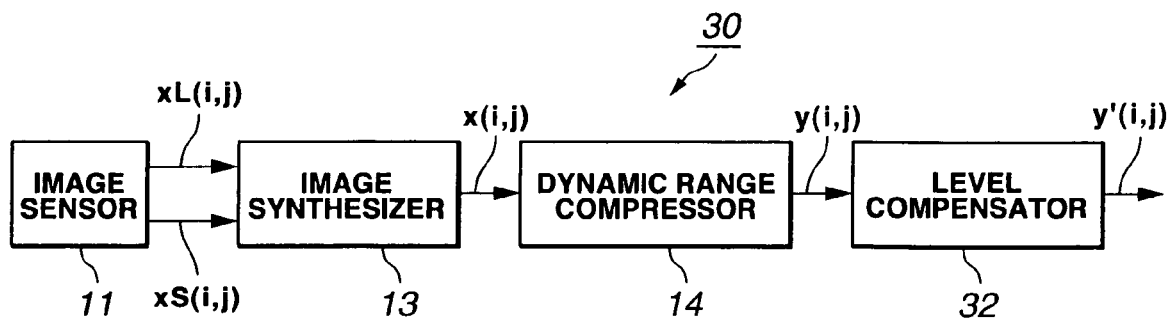
FIG. 20 is a schematic block diagram of a third embodiment of the image pickup apparatus according to the present invention.

Referring now to FIG. 20, there is schematically illustrated in the form of a block diagram the third embodiment of the image pickup apparatus according to the present invention. The image pickup apparatus is generally indicated with a reference 30. As shown in FIG. 20, the basic construction of the image pickup apparatus 30 is similar to that of the image pickup apparatus 20 having been described in the foregoing with reference to FIG. 16, except that a single level compensator 32 different in construction from the level compensators 22a and 22b provided upstream of the image synthesizer 13 is provided downstream of the dynamic range compressor 14. Therefore, in FIG. 20, the same and similar elements as those in FIG. 16 are indicated with the same and similar references as those in FIG. 16 and will not further be described. Note that also this embodiment will be described hereinbelow supposing that input signals to various blocks of the image pickup apparatus 30 are time-series data of pixels acquired by scanning a two-dimensional digital image horizontally and then vertically and a pixel corresponding to a position (i, j) on the image is represented as p (i, j), as shown in FIG. 12.

As shown in FIG. 20, the image pickup apparatus 30 includes an image sensor 11, an image synthesizer 13, a dynamic range compression 14, and a level compensator 32.

The level compensator 32 compensates a compressed image y (i, j) produced by the dynamic range compressor 14. As shown in FIG. 21, the level compensator 32 includes a low-pass filter 35, a multiplier 36 to multiply by a preset factor cE each pixel of a normalized compressed image low' (i, j) which will be described later, a memory 37 which will further be described later, and a subtractor 38 to subtract a compensation amount p (i, j) from an input compressed signal y (i, j), and a normalizer 39. The level compensator 32 is supplied with a compressed image y (i, j) produced by the dynamic range compressor 14 and compensates the level of this input compressed image to produce a compensated compressed image y' (i, j).

The low-pass filter 35 is a mean value filter, similar to the aforementioned low-pass filter 25, which provides a mean value as given by the aforementioned equation (8) to filter the input compressed image y (i, j) to produce a mean compressed image low (i, j) indicative of a mean value of the image y (i, j).

The normalizer 39 is provided to normalize the mean compressed image low (i, j) provided by the low-pass filter 35 to provide a normalized value as given by the following equation (9):

$$low'(i, j) = \begin{cases} 0.0 & \ldots low(i, j) > L\max \\ 1.0 - \frac{low(i, j) - L\min}{L\max - L\min} & \ldots L\min \leq low(i, j) < L\max \\ 1.0 & \ldots low(i, j) \leq L\min \end{cases} \quad (9)$$

where Lmax and Lmin are normalization constants. Each pixel of the normalized compressed image low' (i, j) takes a value above 0 and above 1.

The memory 37 serves as a buffer to delay the input image y (i, j) for a necessary time for filtering by the low-pass filter 35 and normalization by the normalizer 39.

Figure 22:
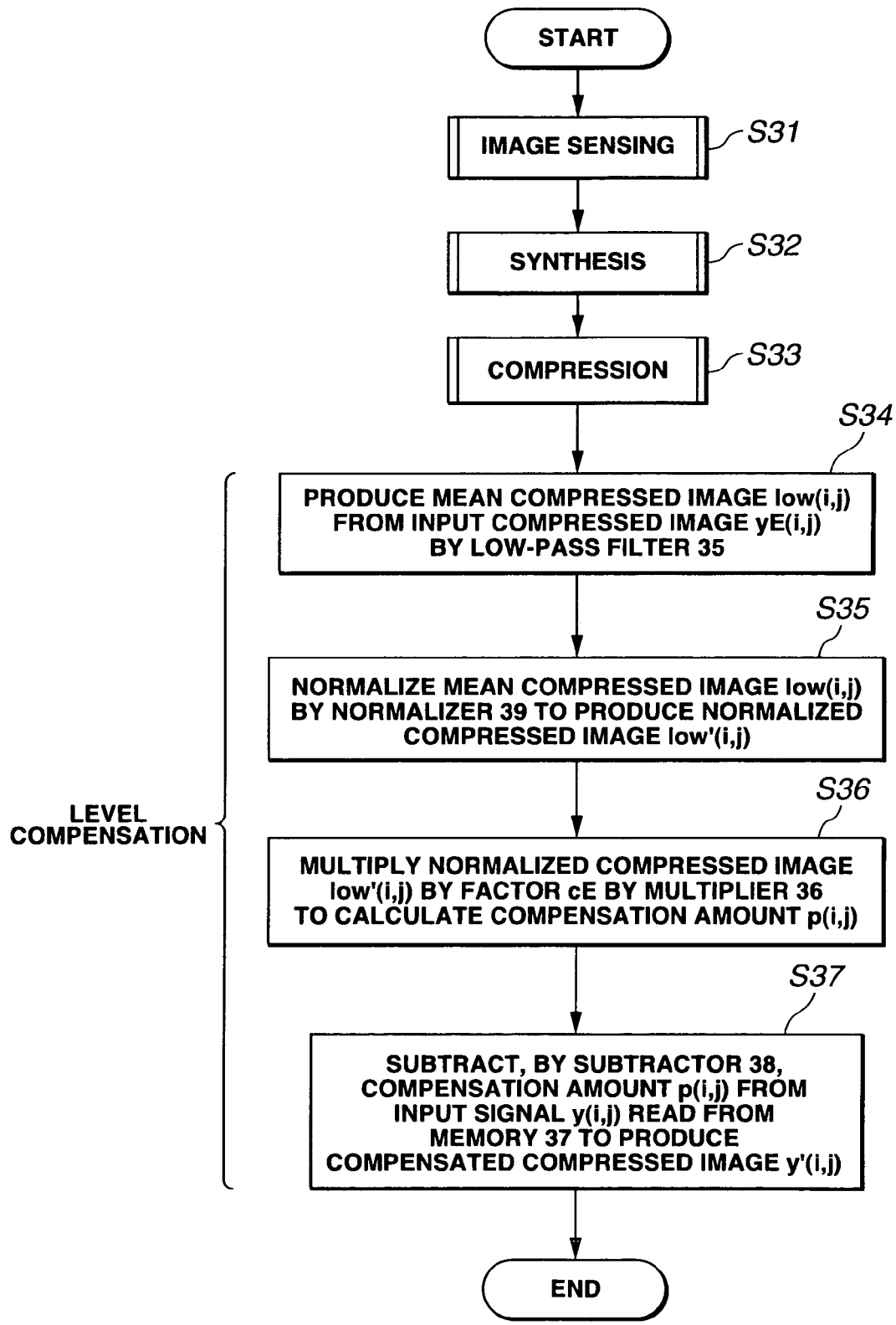
FIG. 22 is a flow chart of a series of operations effected in the image pickup apparatus in FIG. 20.

The image pickup apparatus 30 constructed as in the above effects a series of operations as shown in FIG. 22.

First at step S31 in FIG. 22, the image pickup apparatus 30 produces a long-time exposure image xL (i, j) and a short-time exposure image xS (i, j) with the aid of the image sensor 11 and provides them to the image synthesizer 13.

Next at steps S32, the image synthesizer 13 of the image pickup apparatus 30 will synthesizes the two images xL (i, j) and xS (i, j) to produce a synthetic image x (i, j). Then at step S33, the dynamic range compressor 14 will compress the synthetic image x (i, j) and provides it to the level compensator 32.

Then, the level compensator 32 of the image pickup apparatus 30 compensates the compressed synthetic image y (i, j) at steps S34 to S37.

That is, in the image pickup apparatus 30, the compressed image y (i, j) supplied from the dynamic range compressor 14 to the level compensator 32 is filtered by the low-pass filter 35 at step S34 to produce a mean compressed image low (i, j). The compressed image y (i, j) supplied from the level compensator 32 is also supplied to the memory 37.

Next in the image pickup apparatus 30, the normalizer 39 will normalize the mean compressed image low (i, j) at step S35 to produce a normalized compressed image low' (i, j) each pixel value of which is above 0 and below 1.

Next at step S36, the multiplier 36 in the image pickup apparatus 30 multiplies each of pixel of the normalized compressed image low' (i, j) by the set factor cE to calculate a compensation amount p (i, j) for each pixel. The factor cE is set as a maximum value allowed as the compensation amount p (i, j) subtracted by the subtractor 38.

At step S37, the subtractor 38 in the image pickup apparatus 30 simultaneously reads the compensation amount p (i, j) and the input signal y (i, j) held in the memory 37, and compensates the image level by subtracting the compensation amount p (i, j) from the input signal y (i, j) to produce a compensated compressed image y' (i, j).

Thus in the image pickup apparatus 30, since the compensation amount p (i, j) is subtracted from an area where the signal level is low, it is possible to produce a compensated compressed image y' (i, j) incurring less flare spots which are in the compressed image y (i, j).

Note that in the image pickup apparatus 30, the memory 37 may be provided between the multiplier 36 and subtractor 38 as shown in FIG. 19 to delay the compensation amount p (i, j) by one image from the input signal y (i, j). Thereby the image pickup apparatus 30 may be applied to a dynamic image, and thus the memory 37 may be of a smaller capacity for use of the image pickup apparatus 30 for dealing with a dynamic image.

Also, the image pickup apparatus 30 can of course process not only two images but also more than three images sensed with different exposures by the image sensor 11.

Moreover, the image pickup apparatus 30 can of course make the series of processes on images acquired by exposure for different lengths of time as well as images acquired by controlling the exposure in a space-shared manner, as having been described in the foregoing, and images acquired by controlling the exposure with the aid of multiple image sensing devices, to thereby produce a compensated compressed image y' (i, j).

Furthermore, it is of course that the image sensor 11 may be followed by an image processor to process an input image signal from an external image sensor such as the image sensor 11. In this case, the input image signal may be equivalent to an image signal captured by a variety of cameras, for example. The input image signal may be a scanned image signal supplied a scanner or the like.

Next, the fourth embodiment of the image pickup apparatus according to the present invention will be described with reference to FIGS. 23 to 25.

Figure 23:
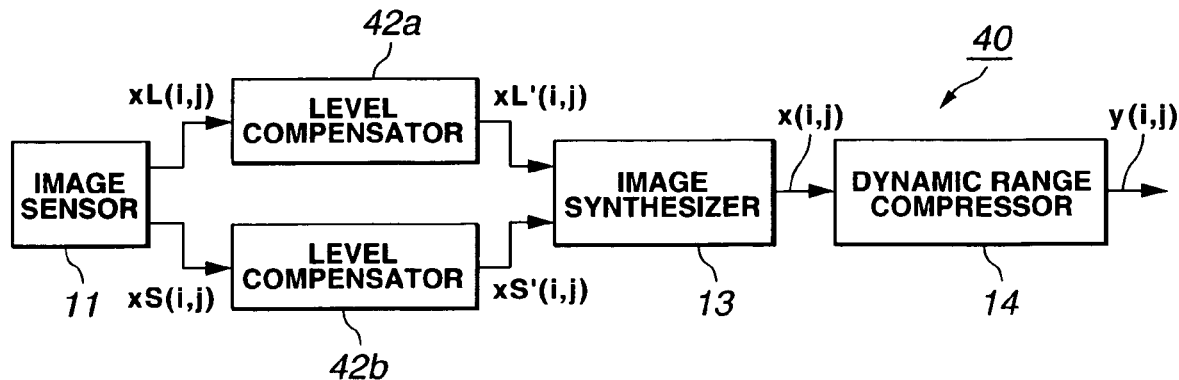
FIG. 23 is a schematic block diagram of a fourth embodiment of the image pickup apparatus according to the present invention.
Figure 24:
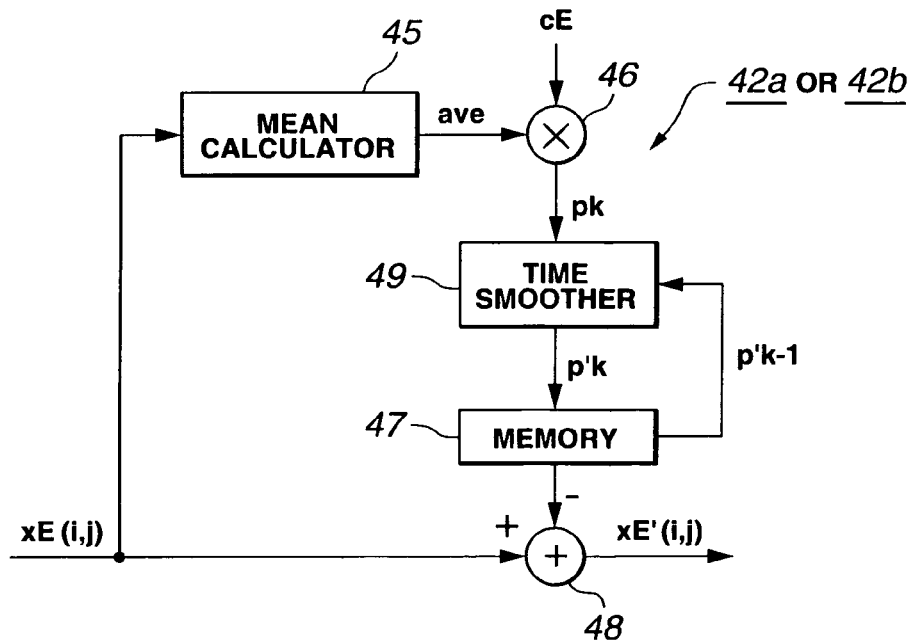
FIG. 24 is a schematic block diagram of the level compensator provided in the image pickup apparatus in FIG. 23.

Referring now to FIG. 23, there is schematically illustrated in the form of a block diagram the fourth embodiment of the image pickup apparatus according to the present invention. The image pickup apparatus is generally indicated with a reference 40. The image pickup apparatus 40 is adapted for dealing with a dynamic image. As shown in FIG. 23, the basic construction of the image pickup apparatus 40 is similar to that of the image pickup apparatus 10 having been described in the foregoing with reference to FIG. 11, except that level compensators 42a and 42b different in construction from each other are provided in place of the level compensators 12a and 12b in the image pickup apparatus 10. Therefore, in FIG. 23, the same and similar elements as those in FIG. 11 are indicated with the same and similar references as those in FIG. 11 and will not further be described. Note that also this embodiment will be described hereinbelow supposing that input signals to various blocks of the image pickup apparatus 40 are time-series data of pixels acquired by scanning a two-dimensional digital image horizontally and then vertically and a pixel corresponding to a position (i, j) on the image is represented as p (i, j), as shown in FIG. 12.

As shown in FIG. 23, the image pickup apparatus 40 includes an image sensor 11, an image synthesizer 13, a dynamic range compression 14, and level compensators 42a and 42b.

The level compensators 42a and 42b are provided to compensate the levels of dynamic images acquired by exposure for different times. As shown in FIG. 24, each of the level compensators 42a and 42b includes a mean calculator 45 to calculate a mean level ave of the input dynamic images, a multiplier 46 to multiply by a preset factor cE the mean level ave calculated by the mean calculator 45, a memory 47 to hold a compensation amount $p'_k$ supplied from a time smoother 49 which will further be described later, a subtractor 48 to subtract the compensation amount $p'_k$ from an input signal xE (i, j), and the time smoother 49. The level compensator 42a is supplied with a long-time exposure image xL (i, j) and compensates the level of this input image to produce a compensated image xL' (i, j). Also the level compensator 42b is supplied with a short-time exposure image xS (i, j) and compensates the level of this input image to produce a compensated image xS' (i, j).

The time smoother 49 is provided to recursively smooth a value $p_k$ supplied from the multiplier 46 to provide a compensation amount $p'_k$ as given by the following equation (10).

$$p'_k = t \times p_k + (1-t) \times p'_{k-1} \quad (10)$$

where $p_k$ is an output provided from the multiplier 46 at a time k, $p'_k$ is a compensation amount calculated by the time smoother 49 at the time k, $p'_{k-1}$ is a compensation amount calculated by the time smoother 49 at a time k−1 one image before the time k and held in the memory 47, t is a preset constant having a value about 0 and below 1 and indicating a weight for the compensation amount calculated at a current time.

Figure 25:
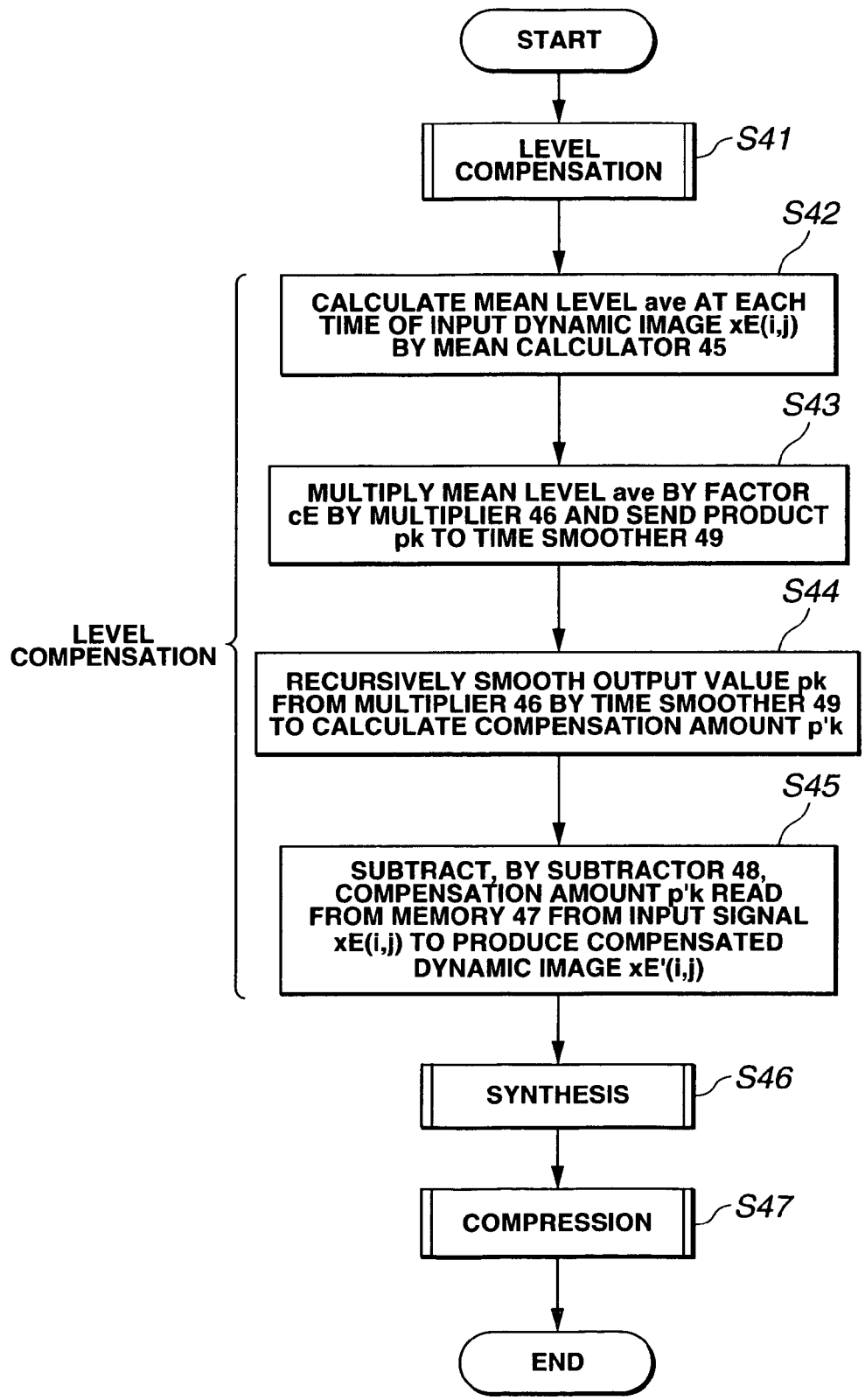
FIG. 25 is a flow chart of a series of operations effected in the image pickup apparatus in FIG. 23.

The image pickup apparatus 40 constructed as in the above effects a series of operations as shown in FIG. 25.

First at step S41 in FIG. 25, the image pickup apparatus 40 produces a long-time exposure image xL (i, j) and a short-time exposure image xS (i, j) with the aid of the image sensor 11 and provides them to the level compensators 42a and 42b, respectively.

Next, the image pickup apparatus 40 will compensate the image levels at steps S42 to S45.

That is, at step S42, the mean calculator 45 of the image pickup apparatus 40 calculates a mean level ave, at each of the times, of two dynamic images xL (i, j) and xS (i, j) (will generically be referred to as "dynamic image xE (i, j) herein) supplied to the level compensators 42a and 42b, respectively, from the image sensor 11 and sends the mean level ave to the multiplier 46. Note that the dynamic image xE (i, j) supplied to the level compensators 42a and 42b from the image sensor 11 is also supplied to the subtractor 48.

Next at step S43, the multiplier 46 in the image pickup apparatus 40 multiplies by the present factor cE the mean level ave calculated by the mean calculator 45 to produce a value $p_k$, and sends the value $p_k$ to the time smoother 49. Also in this embodiment, the factor cE indicates either a factor cL for the long-time exposure image xL (i, j) or a factor cS for the short-time exposure image xS (i, j) and has a value above 0 and below 1. Thus, the factor cE is preset according to the exposure condition under which a dynamic image to be compensated has been sensed, and a larger value is set as the factor cE for a dynamic image sensed by exposure for a longer time.

At step S44, the time smoother 49 in the image pickup apparatus 40 reads the compensation amount $p'_{k-1}$ calculated at a time k−1 one image and held in the memory 47, recursively smoothes, based on the compensation amount $p'_{k-1}$, the value $p_k$ sent from the multiplier 46, and calculates a compensation amount $p'_k$.

Further at step S45, the subtractor 48 in the image pickup apparatus 40 reads the compensation amount $p'_k$ held in the memory 47 simultaneously with an input pixel, and compensates the image level by subtracting the compensation amount $p'_k$ from the input signal xE (i, j) to produce a compensated image xE' (i, j).

Thus in the image pickup apparatus 40, the level compensators 42a and 42b compensate the levels of all the plurality of dynamic images sensed with different exposures, respectively, that is, the long- and short-time exposure images xL (i, j) and xS (i, j) in this embodiment, to produce two compensated dynamic images xL' (i, j) and xS' (i, j), respectively.

Further at step S46, the image synthesizer 13 in the image pickup apparatus 40 synthesizes the two compensated images xL' (i, j) and xS' (i, j) to produce a single synthetic dynamic image x (i, j) having a wide dynamic range.

At step S47, the dynamic range compressor 14 of the image pickup apparatus 40 compresses the synthetic dynamic image x (i, j) to an extent depending upon the status and capability of the output destination to produce a compressed dynamic image y (i, j), and here the series of operations is over.

Note that in the image pickup apparatus 40, this series of operation is effected on all pixels of each image, at each of the times, of the two dynamic images xL (i, j) and xS (i, j).

Thus in the image pickup apparatus 40, the time variation of a compensation amount is minimized to allow a temporally stable dynamic image to be reproduced, and flare spots or components included in each image are well balanced. Thus, an image processing is possible with less influence by the flare components to produce synthesized and compressed dynamic images appearing more natural.

Note that although the image pickup apparatus 40 has the two level compensators 42a and 42b to compensate the levels of both the long-exposure time dynamic image xL (i, j) and short-exposure time dynamic image xS (i, j), the compensation amount $p'_k$ for the short-exposure time dynamic image xS (i, j) may be set zero, thereby omitting the corresponding level compensator 42b.

As mentioned above, in the image pickup apparatus 40, the mean calculator 45 calculates a mean value of a whole image at each time. However, the image pickup apparatus 40 may be adapted such that any area of an image is selected for calculation of a mean pixel value in the selected area.

Further, the image pickup apparatus 40 may be adapted such that a range of pixel level is set taking an exposure time of an image supplied at each time in consideration for each of the level compensators 42a and 42b, and a mean value is calculated of only the pixels falling in the range of pixel level by the mean calculator 45.

Also in the image pickup apparatus 40, there may be provided upstream of the subtractor 48 in addition to the memory 47, as shown in FIG. 15, to delay a dynamic image xE (i, j) to be compensated in order to attain an accurate correspondence between the compensation amount $p'_k$ and the dynamic image signal xE (i, j).

Also, more than three level compensators (including the level compensators 42a and 42b) may be provided in the image pickup apparatus 40 to synthesize more than three dynamic images.

Moreover, the image pickup apparatus 40 can of course synthesize and compress not only dynamic images acquired by exposure for different lengths of time but also dynamic images acquired by controlling the exposure in a space-shared manner, as having been described in the foregoing, and dynamic images acquired by controlling the exposure with the aid of multiple image sensing devices.

Furthermore, it is of course that the image sensor 11 may be followed by an image processor to process an input image signal from an external image sensor such as the image sensor 11. In this case, the input image signal may be equivalent to an image signal captured by a variety of cameras, for example. The input image signal may be a scanned image signal supplied a scanner or the like.

Next, the fifth embodiment of the image pickup apparatus according to the present invention will be described with reference to FIGS. 26 to 28.

Figure 26:
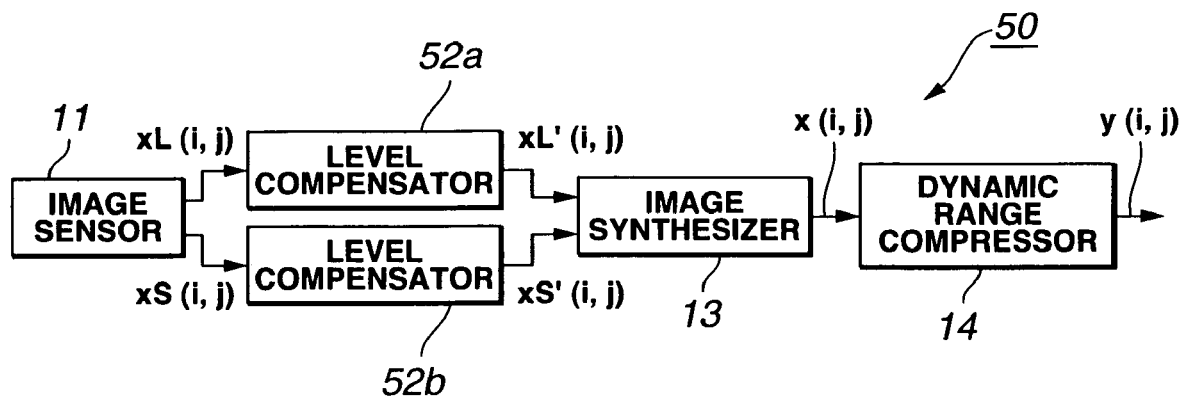
FIG. 26 is a schematic block diagram of a fifth embodiment of the image pickup apparatus according to the present invention.
Figure 27:
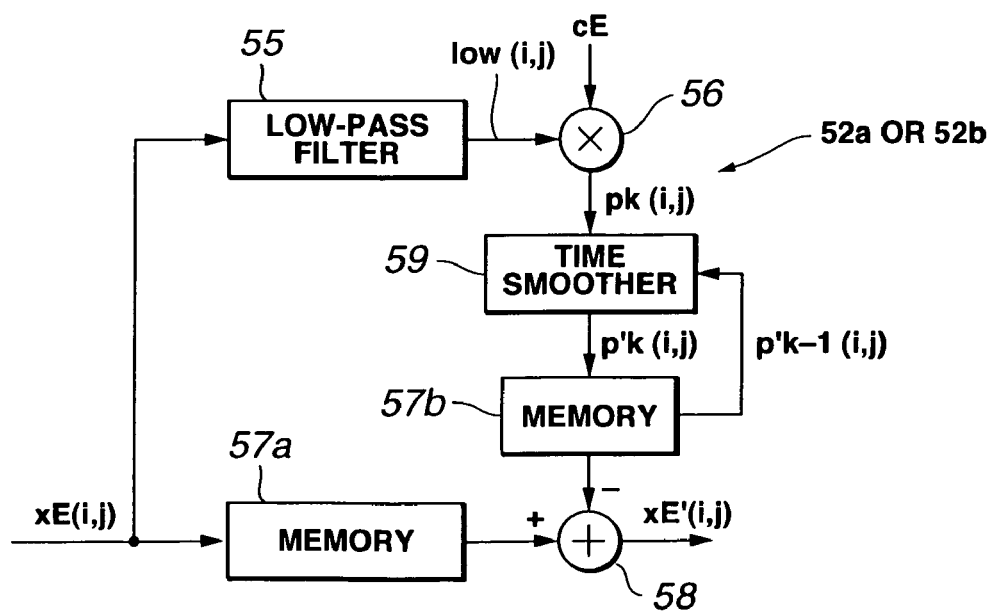
FIG. 27 is a schematic block diagram of the level compensator provided in the image pickup apparatus in FIG. 26.

Referring now to FIG. 26, there is schematically illustrated in the form of a block diagram the fifth embodiment of the image pickup apparatus according to the present invention. The image pickup apparatus is generally indicated with a reference 50. As shown in FIG. 26, the basic construction of the image pickup apparatus 50 is similar to that of the image pickup apparatus 20 having been described in the foregoing with reference to FIG. 16, except that level compensators 52a and 52b different in construction from each other are provided to permit the image pickup apparatus 20 to deal with dynamic images. Therefore, in FIG. 26, the same and similar elements as those in FIG. 16 are indicated with the same and similar references as those in FIG. 16 and will not further be described. Note that this embodiment will be described hereinbelow supposing that input signals to various blocks of the image pickup apparatus 50 are time-series data of pixels acquired by scanning a two-dimensional digital image horizontally and then vertically and a pixel corresponding to a position (i, j) on the image is represented as p (i, j), as shown in FIG. 12.

As shown in FIG. 26, the image pickup apparatus 50 includes an image sensor 11, an image synthesizer 13, a dynamic range compression 14, and level compensators 52a and 52b.

Similarly to the aforementioned level compensators 42a and 42b, the level compensator 52a and 52b are provided to compensate the levels of such images acquired by exposure for different times. As shown in FIG. 27, each of the level compensators 52a and 52b includes a low-pass filter 55, a multiplier 56 to multiply by a preset factor cE each pixel of a mean dynamic image low (i, j) produced by the low-pass filter 55, memories 57a and 57b which will further be described later, a subtractor 58 to subtract a compensation amount p'$_k$ from an input signal xE (i, j), and a time smoother 59. The level compensator 52a is supplied with a long-time exposure dynamic image xL (i, j) and compensates the level of this input image to produce a compensated dynamic image xL' (i, j). Also the level compensator 52b is supplied with a short-time exposure image xS (i, j) and compensates the level of this input image to produce a compensated image xS' (i, j).

The low-pass filter 55 is a mean value filter, similar to the aforementioned low-pass filter 25, which provides a mean value as given by the aforementioned equation (8) to filter the input image xL (i, j) or xS (i, j) (they will be generically referred to as "image xE (i, j)" hereinafter) to produce a mean image low (i, j) indicative of a mean value of the dynamic image xE (i, j) at each time.

The memory 57a serves as a buffer to delay the input dynamic image xE (i, j) for a necessary time for the low-pass filter 55 to filter the input dynamic image and for the time smoother 59 to recursively smooth a compensation amount from the multiplier 56.

The memory 57b holds a compensation amount p'$_k$ (i, j) supplied from the time smoother 59 which will further be described below.

The time smoother 59 recursively smoothes a value p$_k$ (i, j) supplied from the multiplier 56 to calculate a compensation amount p'$_k$ (i, j) as given by the following equation (11):

$$p'_k(i,j)=t \times p_k(i,j)+(1-t) \times p'_{k-1}(i,j) \qquad (11)$$

where p$_k$ (i, j) is an output supplied from the multiplier 56 at a time k, p'$_k$ (i, j) is a compensation amount calculated by the time smoother 59 at the time k, p'$_{k-1}$ (i, j) is a compensation amount calculated at a time k−1 one image before by the timer smoother 59 and held in the memory 57b, and t is a constant having a value above 0 and below 1 and indicating a weight to a compensation amount calculated at a current time.

Figure 28:
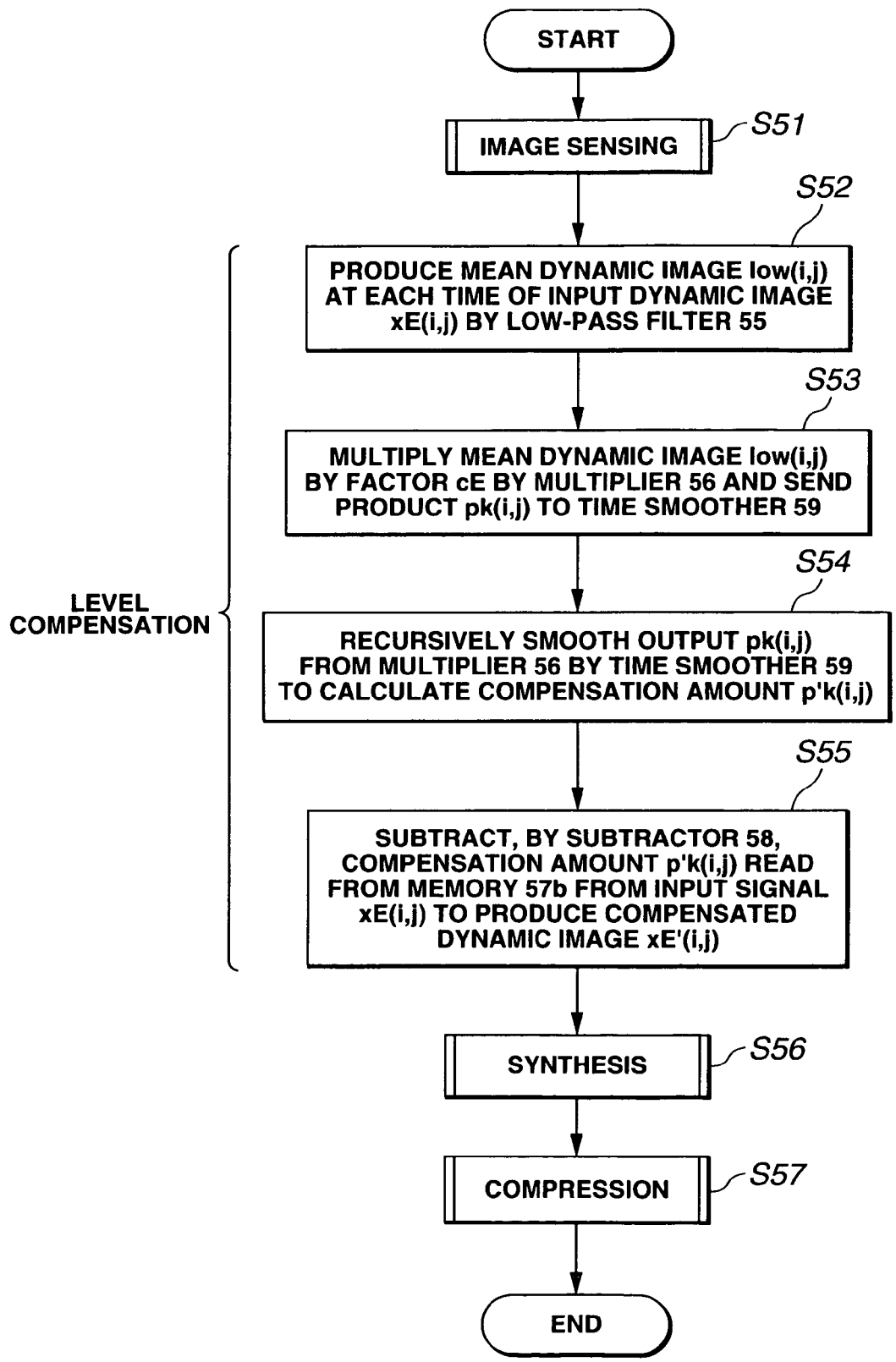
FIG. 28 is a flow chart of a series of operations effected in the image pickup apparatus in FIG. 26.

The image pickup apparatus 50 constructed as in the above effects a series of operations as shown in FIG. 28.

First at step S51 in FIG. 28, the image pickup apparatus 50 produces a long-time exposure dynamic image xL (i, j) and a short-time exposure dynamic image xS (i, j) with the aid of the image sensor 11 and provides them to the level compensators 52a and 52b, respectively.

Next, the image pickup apparatus 50 will compensate the image levels at steps S52 to S55.

That is, at step S52, the low-pass filter 55 in the image pickup apparatus 50 filters the two dynamic images xL (i, j) and xS (i, j) (which will generically referred to as "dynamic image xE (i, j) herein) supplied from the image sensor 11 to the level compensators 52a and 52b, respectively, to produce a mean dynamic image low (i, j) at each time. Note that the dynamic image xE (i, j) supplied from the image sensor 11 to the level compensators 52a and 52b are also supplied to the memory 57a.

Next at step S53, the multiplier 56 in the image pickup apparatus 50 multiplies each pixel of the mean dynamic image low (i, j) produced by the low-pass filter 55 by the preset factor cE to calculate a compensation amount p$_k$ (i, j) for each pixel and provides it to the time smoother 59. Also in this embodiment, the factor cE indicates either a factor cL for the long-time exposure dynamic image xL (i, j) or a factor cS for the short-time exposure dynamic image xS (i, j) and has a value above 0 and below 1. Thus, the factor is set to have a larger value for a dynamic image sensed by exposure for a longer time.

Then at step S54 in the image pickup apparatus 50, the time smoother 59 reads the compensation amount p'$_{k-1}$ (i, j) calculated at a time k−1 one image before and held in the memory 57b, and recursively smoothes, based on the compensation amount p'$_{k-1}$ (i, j), the value p$_k$ (i, j) supplied from the multiplier 56 to calculate a compensation amount p'$_k$ (i, j).

Further At step S55, the subtractor 58 in the image pickup apparatus 50 simultaneously reads the compensation amount p'$_k$ (i, j) held in the memory 57b and the input signal xE (i, j) held in the memory 57a, and compensates the image level by subtracting the compensation amount p'$_k$ (i, j) from the input signal xE (i, j) to produce a compensated dynamic image xE' (i, j).

Thus in the image pickup apparatus 50, the level compensators 52a and 52b compensate the levels of all the plurality of images sensed with different exposures, respectively, that is, the long- and short-time exposure dynamic images xL (i, j) and xS (i, j) in this embodiment, to produce two compensated dynamic images xL' (i, j) and xS' (i, j), respectively.

Further at step S56, the image synthesizer 13 in the image pickup apparatus 50 synthesizes the two compensated dynamic images xL' (i, j) and xS' (i, j) to produce a synthetic dynamic image x (i, j), and the at step S57, the dynamic range compressor 14 compresses the synthetic dynamic image x (i, j) to an extent depending upon the status and capability of the output destination to produce a compressed dynamic image y (i, j). Here the series of operation is over.

Thus in the image pickup apparatus 50, also when calculating a compensation amount with the aid of the low-pass filter 55, the time variation of the compensation amount can be minimized to reproduce a temporally stable dynamic image, and flare components included in each dynamic image can be well balanced. Thus, a dynamic image processing is possible with less influence by the flare components to produce synthesized and compressed dynamic images appearing more natural.

Note that the image pickup apparatus 50 may be adapted such the compensation amount $p'_k$ (i, j) is read from the memory 57b provided downstream of the time smoother 59 and supplied to the subtractor 58 synchronously with an input signal xE (i, j) at a next time, thereby delaying the compensation amount $p'_k$ (i, j) one image from the input signal xE (i, j). Thus, the memory 57a which delays the input signal xE (i, j) may be omitted from the image pickup apparatus 50 so that signal processing is possible with a reduced memory capacity.

Also, more than three level compensators (including the level compensators 52a and 52b) may be provided in the image pickup apparatus 50 to synthesize more than three dynamic images.

Moreover, the image pickup apparatus 50 can of course synthesize and compress not only dynamic images acquired by exposure for different lengths of time but also dynamic images acquired by controlling the exposure in a space-shared manner, as having been described in the foregoing, and dynamic images acquired by controlling the exposure with the aid of multiple image sensing devices.

Furthermore, it is of course that the image sensor 11 may be followed by an image processor to process an input image signal from an external image sensor such as the image sensor 11. In this case, the input image signal may be equivalent to an image signal captured by a variety of cameras, for example. The input image signal may be a scanned image signal supplied a scanner or the like.

Next, the sixth embodiment of the image pickup apparatus according to the present invention will be described with reference to FIGS. 29 to 31.

Figure 29:
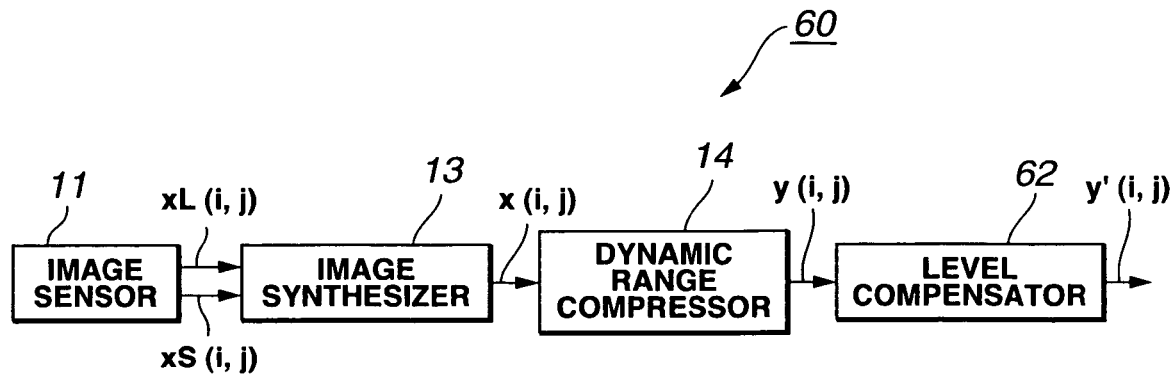
FIG. 29 is a schematic block diagram of a sixth embodiment of the image pickup apparatus according to the present invention.
Figure 30:
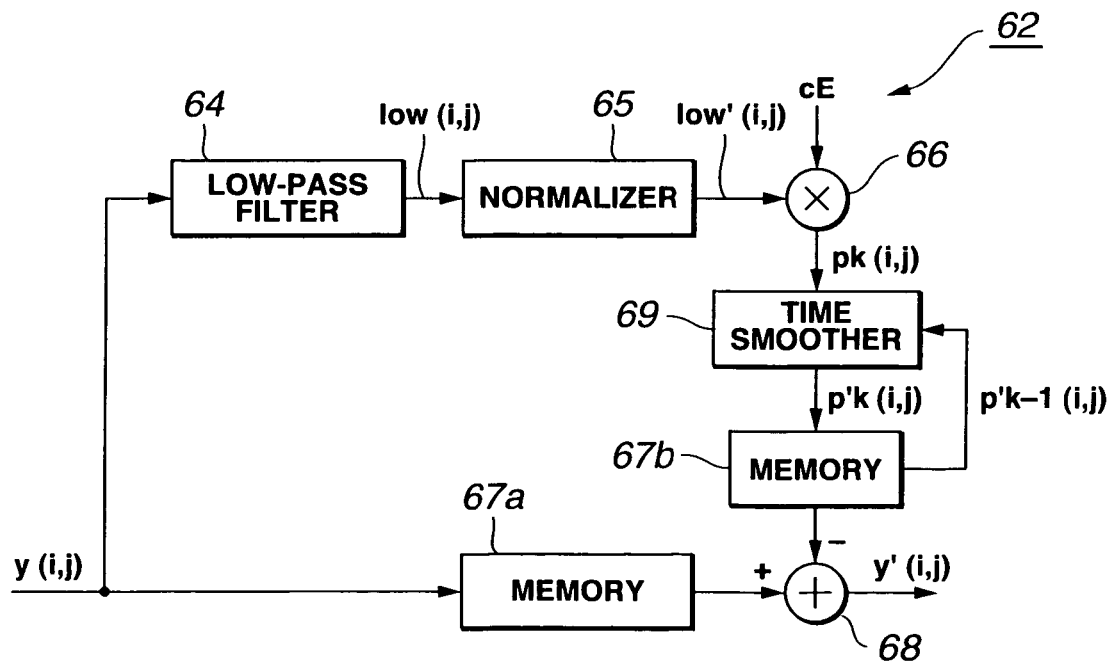
FIG. 30 is a schematic block diagram of the level compensator provided in the image pickup apparatus in FIG. 29.

Referring now to FIG. 29, there is schematically illustrated in the form of a block diagram the sixth embodiment of the image pickup apparatus according to the present invention. The image pickup apparatus is generally indicated with a reference 60. As shown in FIG. 29, the basic construction of the image pickup apparatus 60 is similar to that of the image pickup apparatus 30 having been described in the foregoing with reference to FIG. 20, except that one level compensator 62 is provided to allow the image pickup apparatus 30 to deal with dynamic images. Therefore, in FIG. 29, the same and similar elements as those in FIG. 20 are indicated with the same and similar references as those in FIG. 20 and will not further be described. Note that also this embodiment will be described hereinbelow supposing that input signals to various blocks of the image pickup apparatus 60 are time-series data of pixels acquired by scanning a two-dimensional digital image horizontally and then vertically and a pixel corresponding to a position (i, j) on the image is represented as p (i, j), as shown in FIG. 12.

As shown in FIG. 29, the image pickup apparatus 60 includes an image sensor 11, an image synthesizer 13, a dynamic range compression 14, and the level compensator 62.

Similarly to the level compensators 52a and 52b, the level compensator 62 compensate the levels of dynamic images acquired by exposure for different times. As shown in FIG. 30, the level compensator 62 includes a low-pass filter 64, a normalizer 65, a multiplier 66 to multiply by a set factor cE each pixel of a normalized compressed dynamic image low' (i, j) which will further be described later, memories 67a and 67b which will further be described later, a subtractor 68 to subtract a compensation amount $p'_k$ (i, j) from an input signal y (i, j), and a time smoother 69. The level compensator 62 is supplied with a compressed dynamic image y (i, j) produced by the dynamic range compressor 14 and compensates the level of this input image to produce a compensated compressed dynamic image y' (i, j).

Similar to the aforementioned low-pass filter 25, the low-pass filter 64 is a mean value filter which provides a mean value as given by the aforementioned equation (8) to filter the input image y (i, j) to produce a mean compressed dynamic image low (i, j) indicative of a mean value of the compressed dynamic image y (i, j).

The normalizer 65 is provided to normalize, based on the aforementioned equation (9), the mean compressed dynamic image low (i, j) supplied from the low-pass filter 64 to produce a normalized compressed dynamic image low' (i, j) in which each pixel has a value above 0 and below 1.

The memory 67a serves as a buffer to delay the input compressed dynamic image y (i, j) for a necessary time for the low-pass filter 64 to filter the input compressed dynamic image, the normalizer 65 to normalize the mean compressed dynamic image an for the time smoother 69 to recursively smooth the value from the multiplier 66.

The memory 67b holds the compensation amount $p'_k$ (i, j) supplied from the time smoother 69 which will further be described below.

The time smoother 69 recursively smooth the value $p_k$ (i, j) supplied from the multiplier 66 to calculate a compensation amount $p'_k$ (i, j) as given by the aforementioned equation (11).

Figure 31:
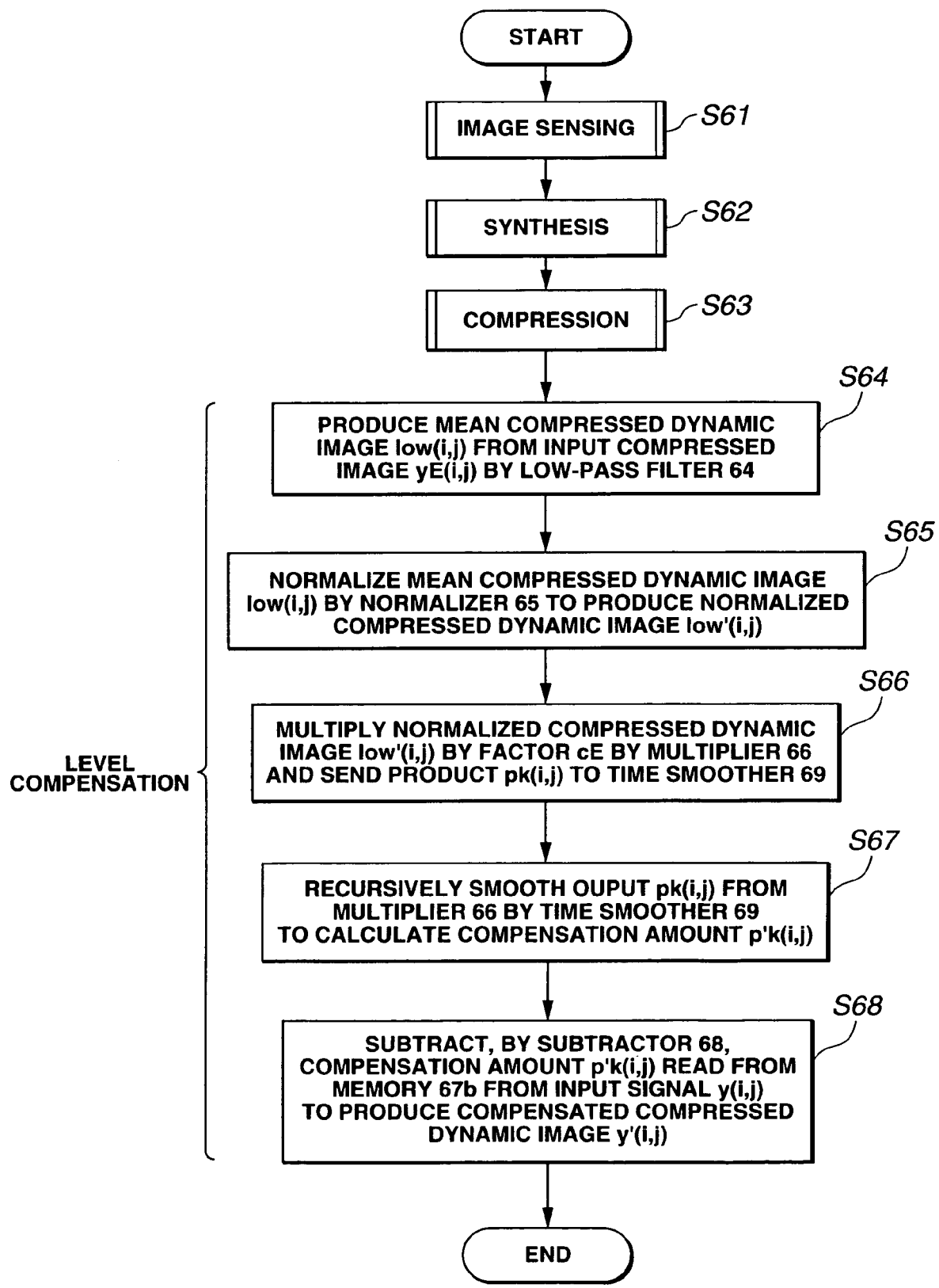
FIG. 31 is a flow chart of a series of operations effected in the image pickup apparatus in FIG. 29.

The image pickup apparatus 60 constructed as in the above effects a series of operations as shown in FIG. 31.

First at step S61 in FIG. 31, the image pickup apparatus 60 produces a long-time exposure dynamic image xL (i, j) and a short-time exposure dynamic image xS (i, j) with the aid of the image sensor 11 and provides them to the image synthesizer 13

Next at step S62, the image pickup apparatus 60 synthesizes the two dynamic images xL (i, j) and xS (i, j) as mentioned above by the image synthesizer 13 to produce a synthetic dynamic image x (i, j), and at step S63, the dynamic range compressor 14 compresses the synthetic dynamic image x (i, j) and provides the compressed dynamic image to the level compensator 62.

Next at steps S64 to S68, the image pickup apparatus 60 will compensate the image levels as will be described below.

That is, at step S64, the image pickup apparatus 60 filters, by the low-pass filter 64, the compressed dynamic images y (i, j) supplied from the dynamic range compressor 14 to the level compensator 62 to produce a mean compressed dynamic image low (i, j) at each time. Note that the compressed dynamic image y (i, j) supplied from the dynamic range compressor 14 to the level compensator 62 is also supplied to the memory 67a.

Next at step S65, the image pickup apparatus 60 normalizes the mean compressed dynamic image low (i, j) by means of the normalizer 65 to produce a normalized compressed dynamic image low' (i, j) in which each pixel has a value above 0 and below 1.

Next at step S66, the image pickup apparatus 60 multiplies, by the multiplier 66, each of pixel of the normalized compressed dynamic image low' (i, j) by the preset factor to calculate a compensation amount $p_k$ (i, j) for each pixel and supplies the compensation value to the time smoother 69. Also in this embodiment, the factor cE is set to have a maximum value allowable as a compensation amount $p'_k$ (i, j) subtracted from the input signal by the subtractor 68.

At step S67, the time smoother 69 in the image pickup apparatus 60 reads the compensation amount $p'_{k-1}$ (i, j) calculated at a time k−1 one image before and held in the memory 67b, and recursively smoothes, based on the compensation amount $p'_{k-1}$ (i, j), a value $p_k$ (i, j) supplied from the multiplier 66 to calculate a compensation amount $p'_k$ (i, j).

At step S68, the subtractor 68 in the image pickup apparatus 60 simultaneously reads the compensation amount $p'_k$ (i, j) held in the memory 67b and the input signal y (i, j) held in the memory 67a, and compensates the image level by subtracting the compensation amount $p'_k$ (i, j) from the input signal y (i, j) to produce a compensated image y' (i, j). Here, the series of operations is over.

As in the above, also when compensating the level of the compressed dynamic image y (i, j) whose dynamic range has been compressed, the time variation of the compensation amount $p'_k$ (i, j) can be minimized to reproduce a temporally stable dynamic image, and the compensation amount $p'_k$ (i, j) is subtracted from a low level area, so that a compensated compressed dynamic image y' (i, j) can be produced which incurs less flare spots which have been found in the compressed dynamic image y (i, j).

Note that by adapting the image pickup apparatus 60 such the compensation amount $p'_k$ (i, j) is read from the memory 67b provided downstream of the time smoother 69 to the subtractor 68 synchronously with the input signal y (i, j) at a next time and the compensation amount $p'_k$ (i, j) is delayed one image from the input signal y (i, j), the memory 67a to delay the input signal y (i, j) may be omitted from the image pickup apparatus 60. Thus, image processing can be done even with a reduced memory capacity.

Also the image pickup apparatus 60 can of course be so adapted as to process not only two dynamic images but also more than three dynamic images acquired by the image sensor 11 and different in exposure from each other.

Moreover, the image pickup apparatus 60 can of course produce a compensated compressed dynamic image y' (i, j) by processing not only images acquired by exposure for different lengths of time but also images acquired by controlling the exposure in a space-shared manner, as having been described in the foregoing, and images acquired by controlling the exposure with the aid of multiple image sensing devices.

Furthermore, it is of course that the image sensor 11 may be followed by an image processor to process an input image signal from an external image sensor such as the image sensor 11. In this case, the input image signal may be equivalent to an image signal captured by a variety of cameras, for example. The input image signal may be a scanned image signal supplied a scanner or the like.

Next, the seventh embodiment of the image pickup apparatus according to the present invention will be described with reference to FIGS. 32 to 33.

Figure 32:
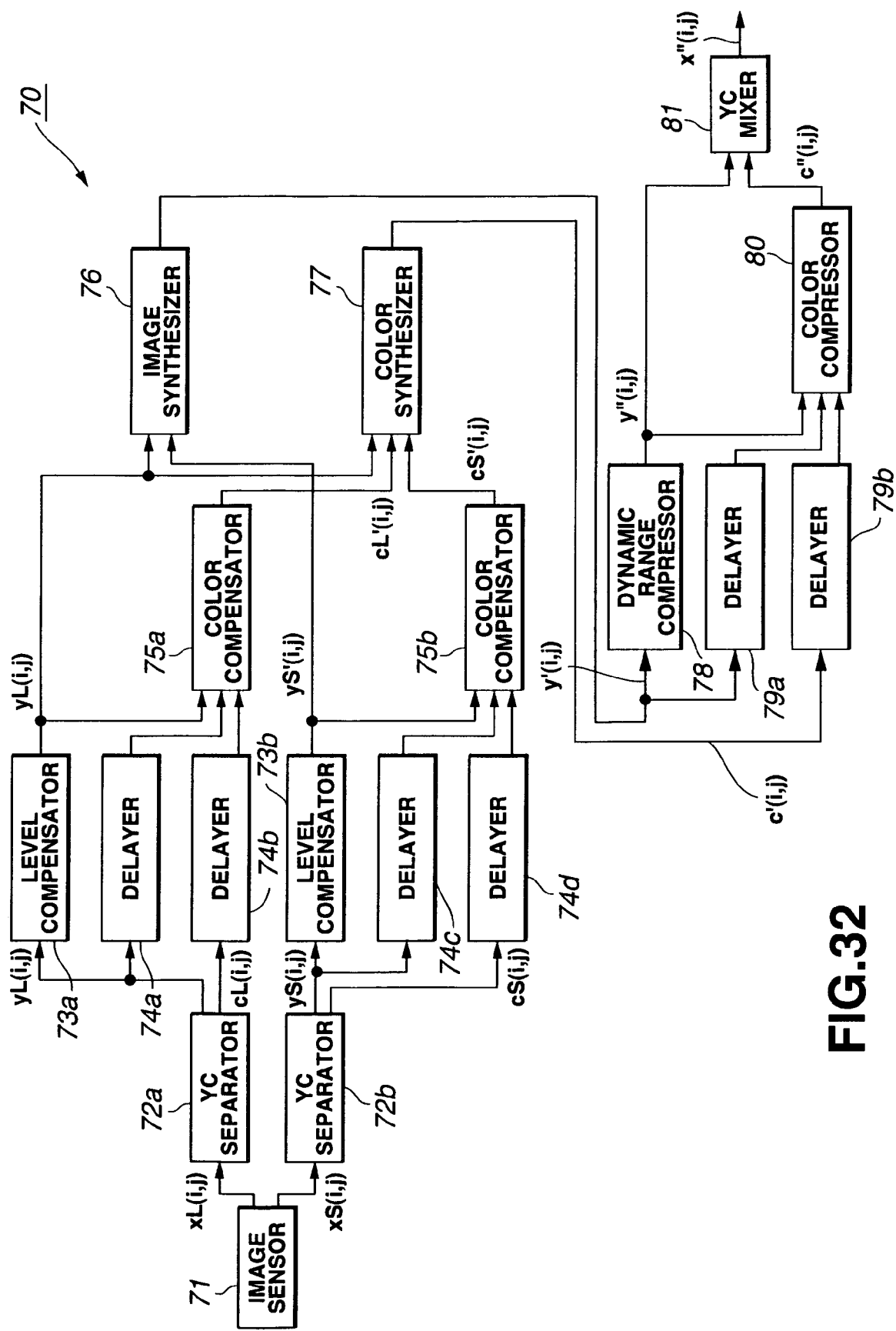
FIG. 32 is a schematic block diagram of a seventh embodiment of the image pickup apparatus according to the present invention.

Referring now to FIG. 32, there is schematically illustrated in the form of a block diagram the seventh embodiment of the image pickup apparatus according to the present invention. The image pickup apparatus is generally indicated with a reference 70. This image pickup apparatus 70 is intended for application to a single-image sensing device color camera. Note that also this embodiment will be described hereinbelow supposing that input signals to various blocks of the image pickup apparatus 70 are time-series data of pixels acquired by scanning a two-dimensional digital image horizontally and then vertically and a pixel corresponding to a position (i, j) on the image is represented as p (i, j), as shown in FIG. 12.

As shown in FIG. 32, the image pickup apparatus 70 includes an image sensor 71, YC separators 72a and 72b, level compensators 73a and 73b, delayers 74a, 74b, 74c and 74d, color compensators 75a and 75b, an image synthesizer 76, a color synthesizer 77, a dynamic range compressor 78, delayers 79a and 79b, a color compressor 80, and a YC mixer 81.

Figure 1:
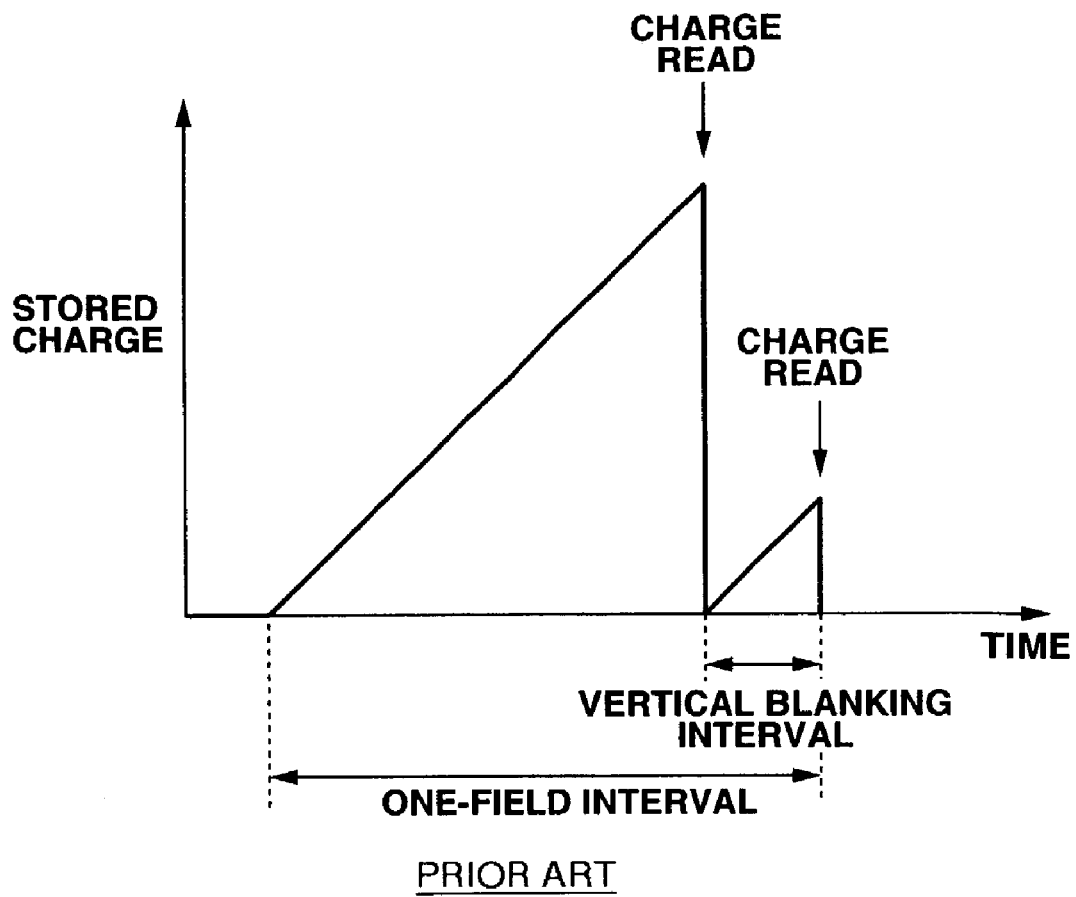
FIG. 1 shows the principle of the time-shared exposure control method.
Figure 2:
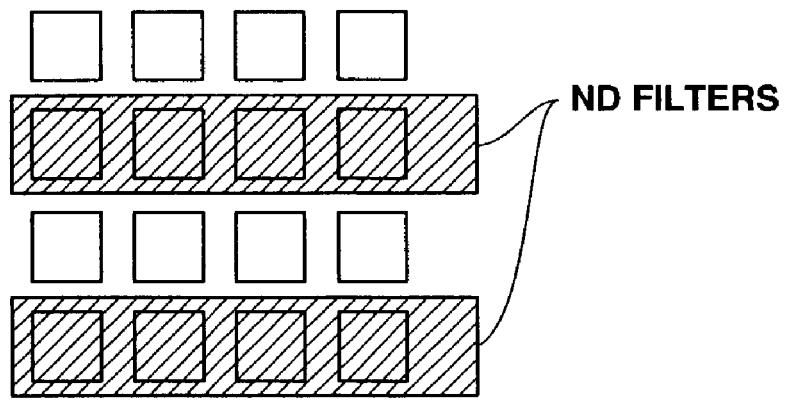
FIG. 2 shows the method of space-shared exposure control.
Figure 3:
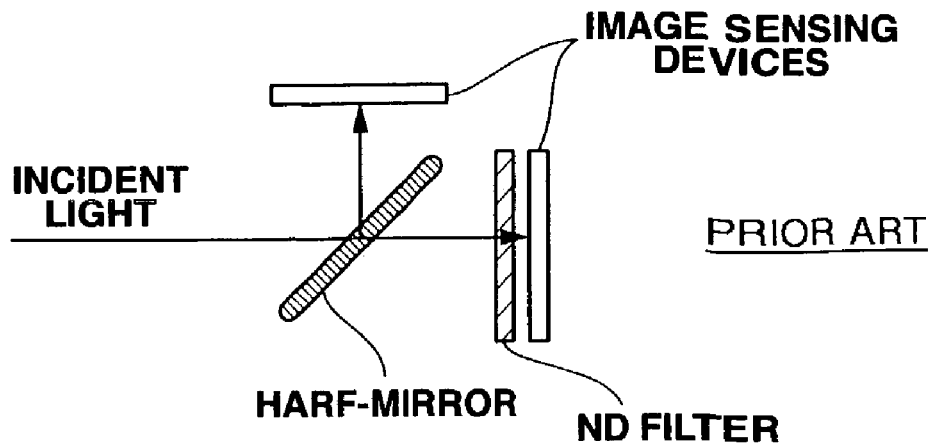
FIG. 3 shows the method of controlling exposure by multiple image sensing devices.
Figure 4:
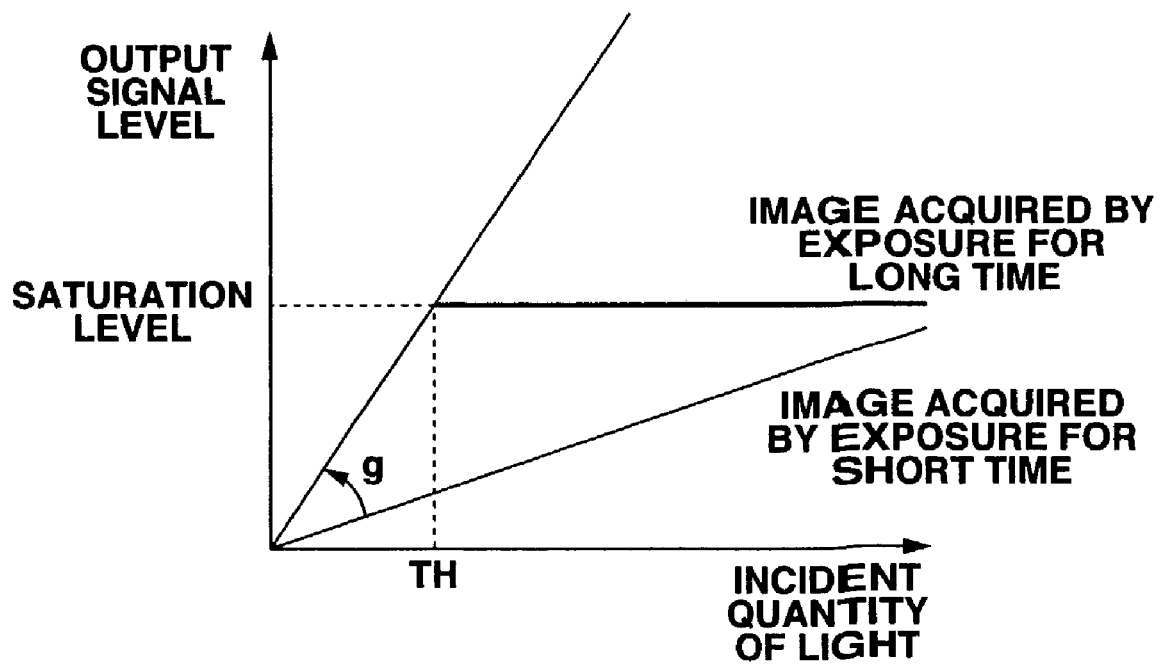
FIG. 4 shows the principle of image synthesis.
Figure 5:
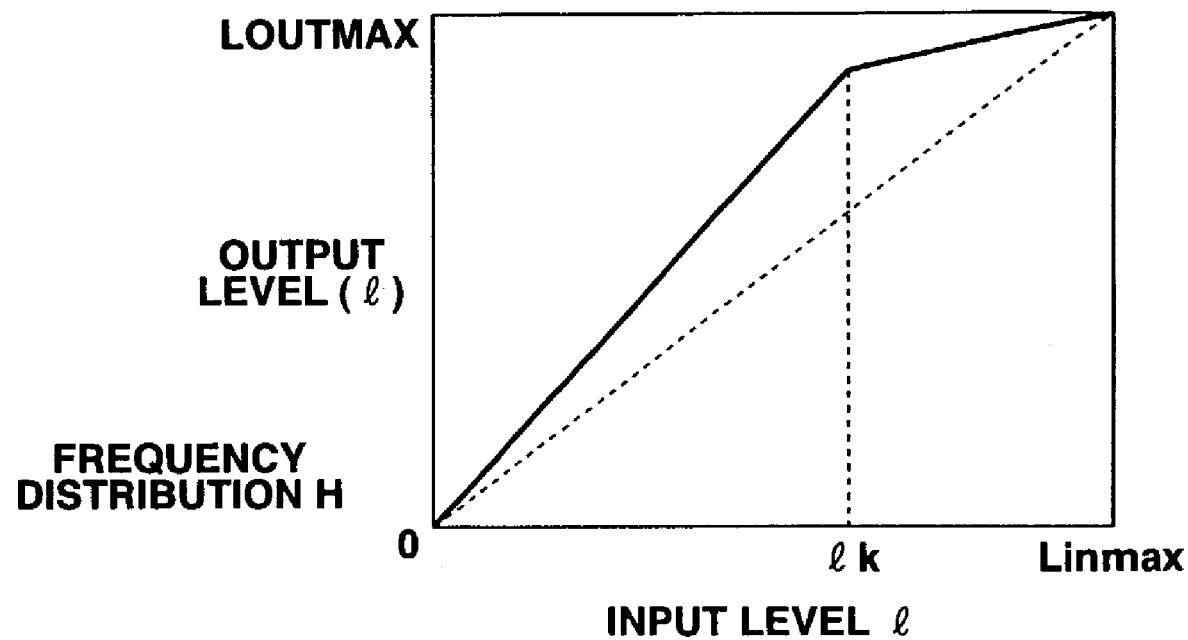
FIG. 5 shows an example of the level conversion function used in level conversion.
Figure 6:
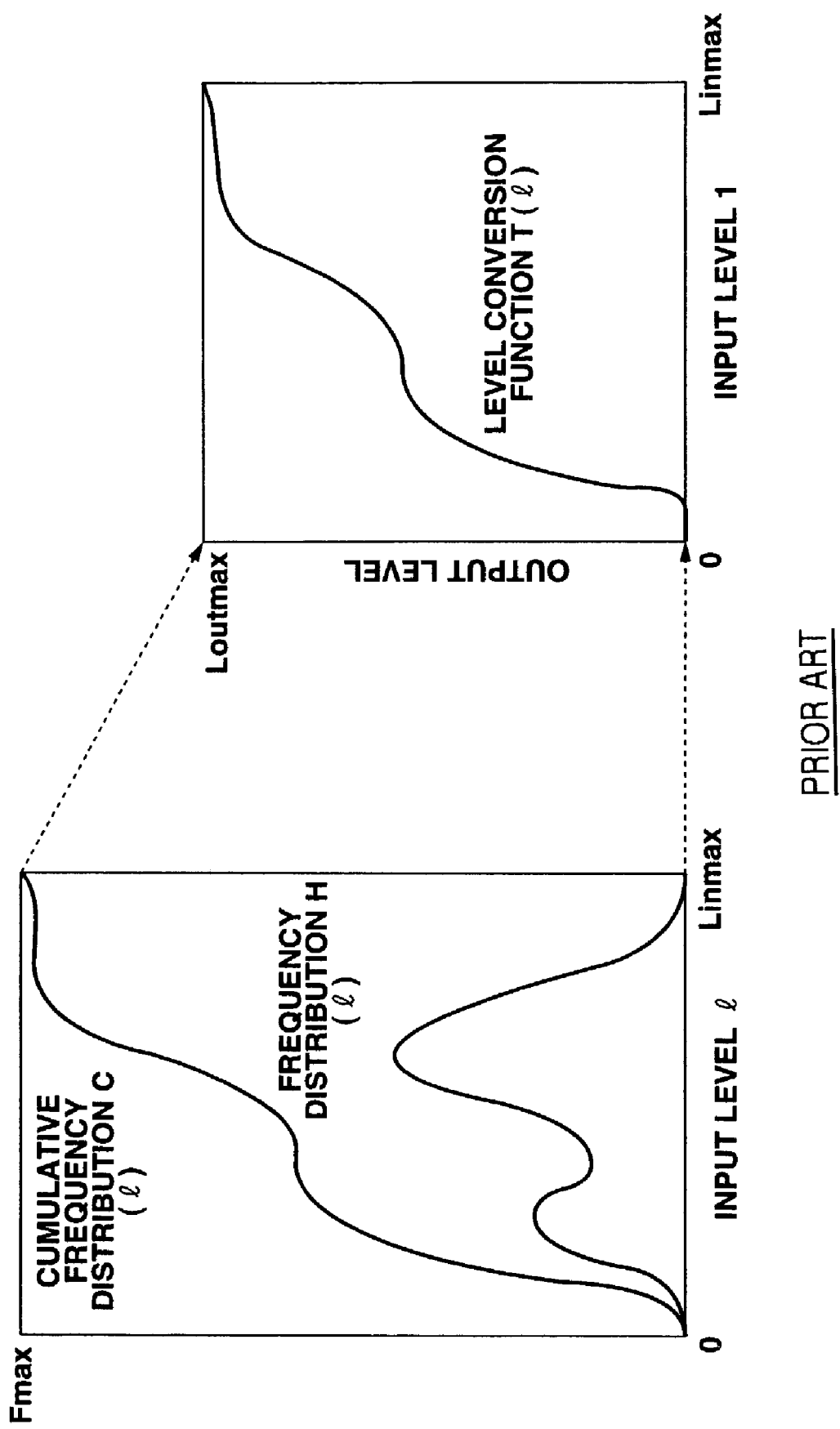
FIG. 6 shows the principle of histogram equalization.
Figures 7, 8:
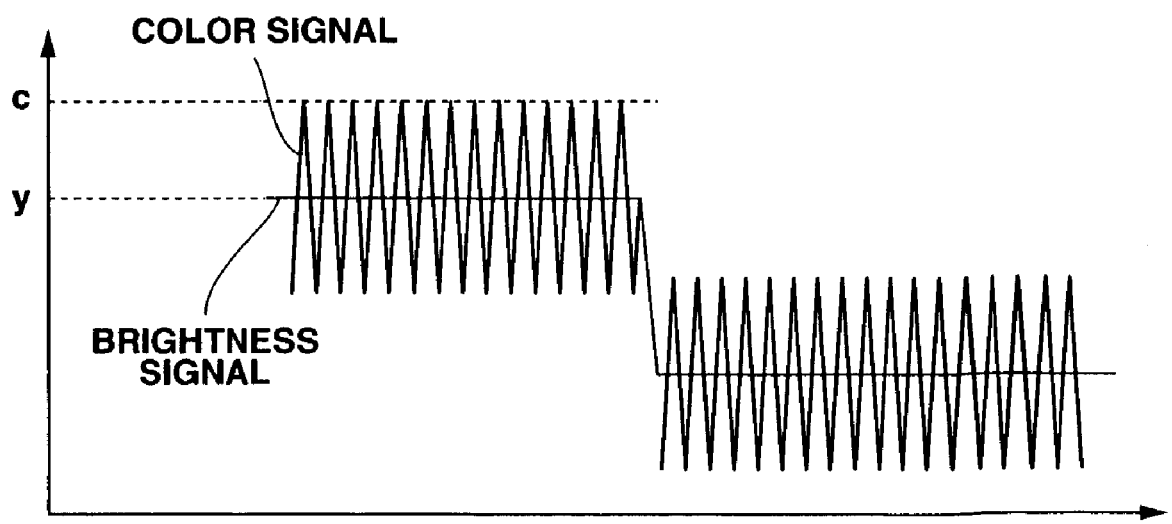
FIG. 7 shows an example of the color filter disposition in a single-image sensing device color camera.
FIG. 8 shows an example of the output signal from the single-image sensing device color camera.

The image sensor 71 consists of an image sensing device (not shown) such as CCD and a color filter disposed on the front of the image sensing device. The color filter a color layout as shown in FIG. 7 for example. The image sensor 7 will provide an output signal in which a frequency-modulated color signal is superposed on a brightness signal as shown in FIG. 8. The image sensor 71 has the exposure controlled by an electronic shutter or the like (not shown) to provide a long exposure time image xL (i, j) acquired by exposure for a long time to the YC separator 72a provided downstream of the image sensor 71, and a short exposure time image xS (i, j) acquired by exposure for a short time to the YC separator 72b provided downstream of the image sensor 71.

The YC separators 72a and 72b separate an image supplied from the image sensor 71 into a brightness signal and color signal with the aid of a low-pass filter (not shown). More specifically, the YC separator 72a separates the long exposure time image xL (i, j) supplied from the image sensor 71 into a brightness signal yL (i, j) and color signal cL (i, j) on the basis of the aforementioned equation (5), while the YC separator 72b separates the short exposure time image xS (i, j) supplied from the image sensor 71 into a brightness signal yS (i, j) and color signal cS (i, j) in a similar manner.

The level compensators 73a and 73b are provided to compensate the levels of the brightness signal yL (i, j) and color signal yS (i, j) separated by the YC separators 72a and 72b. These level compensators 73a and 73b are constructed similarly to any one of the level compensators included in the previously described first, second, third, fourth and fifth embodiments of the present invention, and hence they will not further be described. The level compensator 73a receives the brightness signal yL (i, j) and compensates the level of the input signal to produce a compensated brightness signal yL' (i, j), while the level compensator 73b receives the brightness signal yS (i, j) and compensates the level of the input signal to produce a compensated brightness signal yS' (i, j).

The delayers 74a and 74c receive the brightness signals yL (i, j) and yS (i, j) separated by the YC separators 72a and 72b, respectively, and provide these signals to the color compensators 75a and 75b, respectively, provided downstream thereof after lapse of a time necessary for the level compensators 73a and 73b to compensate the signal levels, respectively.

The delayers 74b and 74d receive the color signals cL (i, j) and cS (i, j) separated by the YC separators 72a and 72b, respectively, and provide these signals to the color compensators 75a and 75b, respectively, provided downstream thereof after lapse of a time necessary for the level compensators 73a and 73b to compensate the signal levels, respectively.

The color compensators 75a and 75b compensate the color signals cL (i, j) and cS (i, j), respectively, on the basis of the following equation (12) for the ratio of the color signals with the brightness signals yL (i, j) and yS (i, j) not to vary before and after the compensation, to produce compensated color signals cL' (i, j) and cS' (i, j), respectively.

$$cE'(i, j) = \frac{yE'(i, j)}{yE(i, j)} \times cE(i, j) \qquad (12)$$

where cE' (i, j) is a compensated color signal indicative of cL' (i, j) or cS' (i, j), cE (i, j) indicates the above-mentioned color signal cL (i, j) or cS (i, j), yE (i, j) indicates the brightness signal yL (i, j) or yS (i, j) whose level has not yet been compensated, and yE' (i, j) indicates a compensated brightness signal yL' (i, j) or yS' (i, j) whose level has been compensated.

The image synthesizer 76 synthesizes, by the aforementioned variety of synthesizing processes, the two compensated brightness signals yL' (i, j) and yS' (i, j) whose levels have been compensated by the level compensators 73a and 73b, respectively, to produce a single synthetic brightness signal y' (i, j) whose dynamic range is wide.

The color synthesizer 77 receives the compensated color signals cL' (i, j) and cS' (i, j) supplied from the color compensators 75a and 75b, respectively, and also the compensated brightness signal yL' (i, j) from the level compensator 73a, and synthesizes the two compensated color signals cL' (i, j) and cS' (i, j) referring to the compensated brightness signal yL' (i, j) to produce a synthetic color signal c' (i, j).

The dynamic range compressor 78 compresses the dynamic range of the synthetic brightness signal y' (i, j) by the aforementioned variety of compressing processes to an extent depending upon the capabilities of the output transmission system, display apparatus, recording apparatus, etc. to produce a compressed brightness signal y" (i, j). It provides the compressed brightness signal y" (i, j) to the YC mixer 81 provided downstream thereof and also to the color compressor 80.

The delayer 79a delays the synthetic brightness signal y' (i, j) from the image synthesizer 76 a necessary time for the dynamic range compressor 78 to compress the dynamic range of the synthetic brightness signal, and then provides it to the color compressor 80.

The delayer 79b delays the synthetic color signal c' (i, j) from the color synthesizer 77 a necessary time for the dynamic range compressor 78 to compress the dynamic range of the synthetic brightness signal, and then provides it to the color compressor 80.

The color compressor 80 compresses the synthetic color signal c' (i, j) by the aforementioned variety of compressing processes to produce a compressed color signal c" (i, j) and provides it to the YC mixer 81 provided downstream thereof.

The YC mixer 81 modulates the frequency of the compressed color signal c" (i, j) from the color compressor 80 on the basis of the following equations (13), and adds to the frequency-modulated compressed color signal the compressed brightness signal y" (i, j) supplied from the dynamic range compressor 78, to thereby produce a mixed signal x" (i, j). It delivers the mixed signal to outside.

$$x''(i, j) = y''(i, j) + v_i \times c''(i, j) \qquad (13)$$

$$v_i = \begin{cases} 1 & \dots i : \text{even} \\ -1 & \dots i : \text{odd} \end{cases}$$

Figure 33:
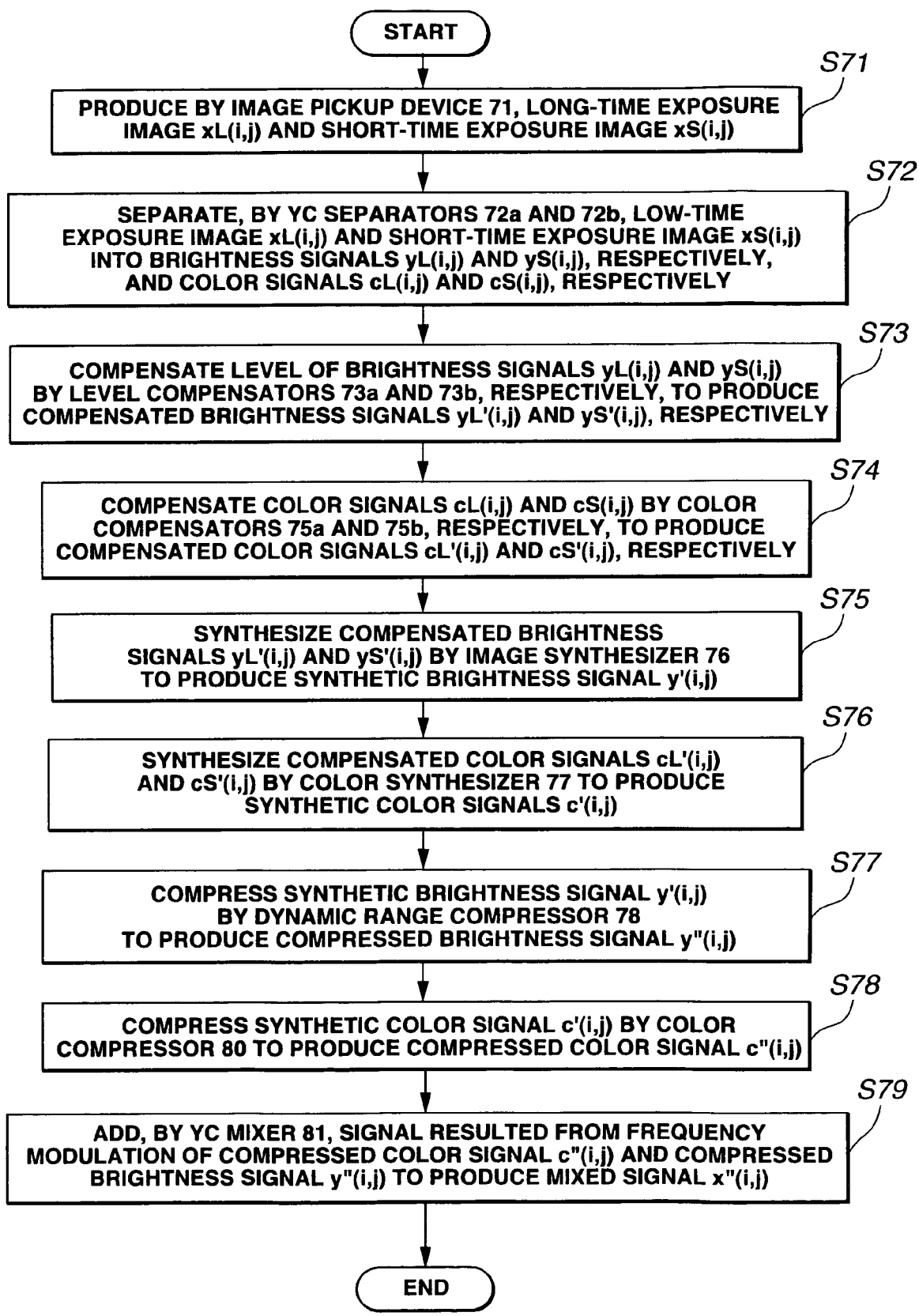
FIG. 33 is a flow chart of a series of operations effected in the image pickup apparatus in FIG. 32.

The image pickup apparatus 70 constructed as in the above effects a series of operations as shown in FIG. 33.

First in the image pickup apparatus 70, the image sensor 71 produces the long-exposure time image xL (i, j) and short-exposure time image xS (i, j) and provides them to the YC separators 72a and 72b, respectively, at step S71 in FIG. 33.

Next in the image pickup apparatus 70, the YC separators 72a and 72b separate the two images xL (i, j) and xS (i, j), respectively, into the brightness signal yL (i, j) and yS (i, j) and color signals cL (i, j) and cS (i, j), respectively, at step S72. In the image pickup apparatus 70, the brightness signals yL (i, j) and yS (i, j) are supplied to the level compensators 73a and 73b, respectively, provided downstream of the YC separators and also to the delayers 74a and 74c, respectively. Also in the image pickup apparatus 70, the color signals cL (i, j) and cS (i, j) are supplied to the delayers 74b and 74d, respectively, provided downstream of the YC separators.

Then in the image pickup apparatus 70, the level compensators 73a and 73b compensate the levels of the brightness signals yL (i, j) and yS (i, j) as having previously been described, at step S73. In the image pickup apparatus 70, the level-compensated brightness signals yL' (i, j) and yS' (i, j) are supplied to the color compensators 75a and 75b, respectively, provided downstream of the delayers. Also in the image pickup apparatus 70, the compensated brightness signals yL' (i, j) and yS' (i, j) are supplied to the image synthesizer 76 provided downstream of the color compensators. Then the compensated brightness signal yL' (i, j) is supplied also to the color synthesizer 77 provided downstream of the image synthesizer 76.

Further in the image pickup apparatus 70, the color compensators 75a and 75b compensate the color signals cL (i, j) and cS (i, j) to produce the compensated color signals cL' (i, j) and cS' (i, j) at step S74. At this time, the compensation is done referring to the compensated brightness signals yL' (i, j) and yS' (i, j) and the brightness signals yL (i, j) and yS (i, j) delayed by the delayers 74a and 74c a time required for the level compensators 73a and 73b to compensate the signal levels. Both the compensated color signals cL' (i, j) and cS' (i, j) thus produced are supplied to the color synthesizer 77.

Next at step S75, the image synthesizer 76 synthesizes the compensated brightness signals yL' (i, j) and yS' (i, j) by the aforementioned variety of synthesizing processes to produce one synthetic brightness signal y' (i, j) having a wide dynamic range, and provides it to the dynamic range compressor 78 and delayer 79a provided downstream of the image synthesizer.

Also at step S76, the color synthesizer 77 synthesizes the compensated color signals cL' (i, j) and cS' (i, j) referring to the size of the compensated brightness signal yL' (i, j) acquired with many different exposures, to thereby produce the synthetic color signal c' (i, j). The synthetic color signal c' (i, j) is supplied to the delayer 79b provided downstream of the color synthesizer.

Further at step S77, the dynamic range compressor 78 compresses the dynamic range of the synthetic brightness signal y' (i, j) by the aforementioned variety of compressing processes to produce the compressed brightness signal y" (i, j), and provides it to the YC mixer 81 and color compressor 80 provided downstream thereof.

Also at step 78, the color compressor 80 compresses the synthetic color signal c' (i, j) delayed by the delayer 79b a time required for the dynamic range compressor 78 to compress the dynamic range of the synthetic brightness signal, to thereby produce the compressed color signal c" (i, j), and provides it to the YC mixer 81 provided downstream thereof. At this time, reference is made to the compressed brightness signal y" (i, j) and the synthetic brightness signal y' (i, j) delayed by the delayer 79a the time required for the dynamic range compressor 78 to compress the dynamic range of the synthetic brightness signal, to produce the compressed color signal c" (i, j).

At step S79, the YC mixer 81 modulates the frequency of the compressed color signal c" (i, j) supplied from the color compressor 80 and adds to this frequency-modulated compressed color signal the compressed brightness signal y" (i, j) supplied from the dynamic range compressor 78, to thereby produce the mixed signal x" (i, j). This mixed signal x" (i, j) is delivered to the output transmission system, display apparatus, recording apparatus and the like (not shown), and here the series of operation is over.

Thus the image pickup apparatus 70 can appropriately compensate in level the images xL (i, j) and xS (i, j) in which the frequency-modulated color signals cL (i, j) and cS (i, j) are superposed on the brightness signals yL (i, j) and yS (i, j), as well to reproduce a color image represented in various forms into synthetic and compressed images which appear natural in accurate colors.

Note that the image pickup apparatus 70 is essentially destined for a level compensation which enables a natural synthesis and compression of a color image and the image synthesis and compression manners are not limited to those described herein but any other synthesizing and compressing methods may be used in combination.

Although the image pickup apparatus 70 is adapted to compensate the levels of both long-exposure time image xL (i, j) and short-exposure time image xS (i, j), the compensation amount may be set zero for the short-exposure time image xS (i, j) to omit the corresponding level compensator 73b.

Further, the image pickup apparatus 70 may of course be adapted, by increasing the number of level compensators, to process two images, as having been described in the foregoing, as well as more than three images captured by the image sensor 71 and different in exposure from each other.

Moreover, the image pickup apparatus 70 can of course produce a mixed image x" (i, j) by processing not only images acquired by exposure for different lengths of time but also images acquired by controlling the exposure in a space-shared manner, as having been described in the foregoing, and images acquired by controlling the exposure with the aid of multiple image sensing devices.

Furthermore, it is of course that the image sensor 71 may be followed by an image processor to process an input image signal from an external image sensor such as the image sensor 71. In this case, the input image signal may be equivalent to an image signal captured by a variety of cameras, for example. The input image signal may be a scanned image signal supplied a scanner or the like.

Next, the eighth embodiment of the image pickup apparatus according to the present invention will be described with reference to FIGS. 34 and 35.

Figure 34:
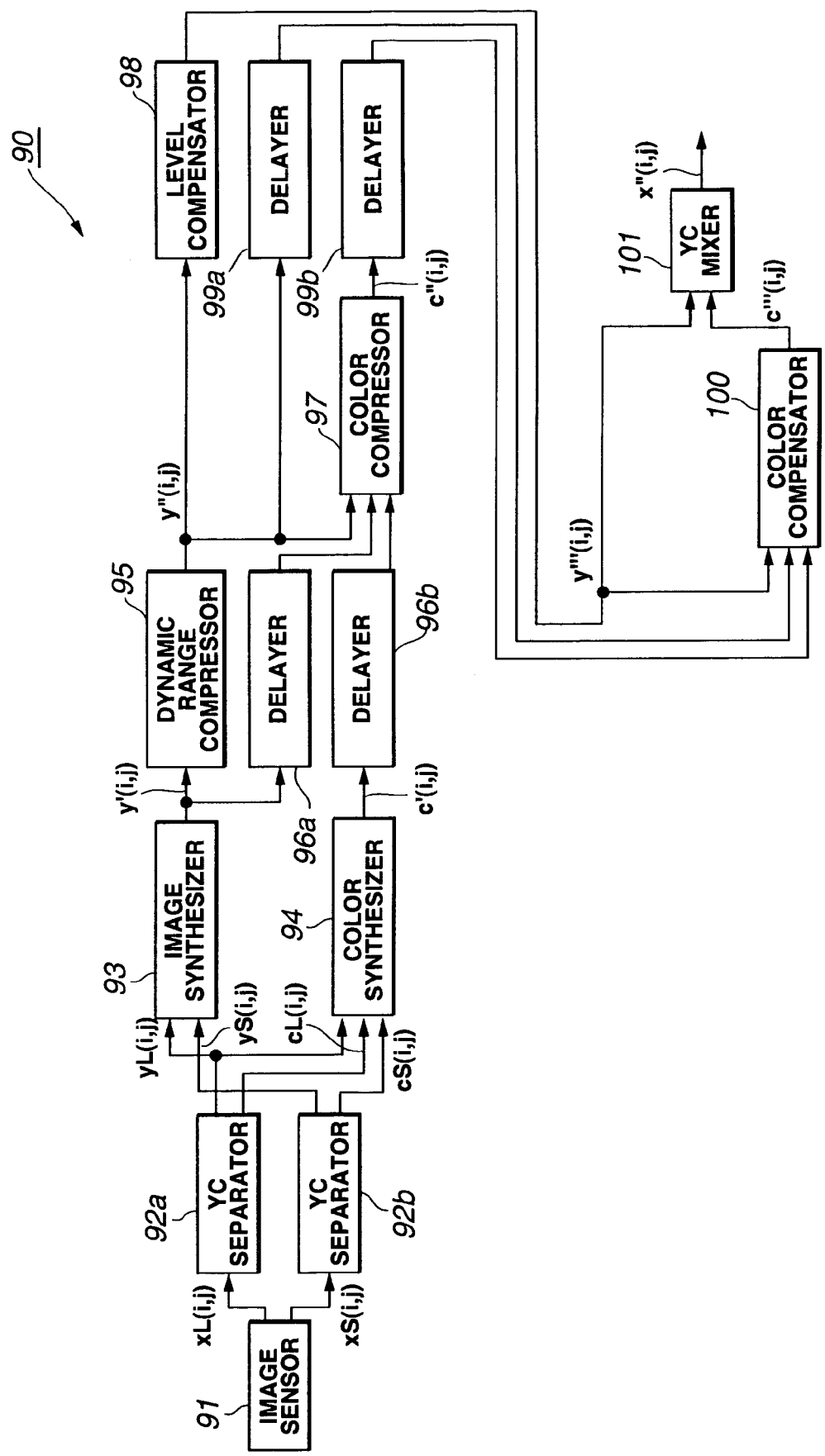
FIG. 34 is a schematic block diagram of an eighth embodiment of the image pickup apparatus according to the present invention.

Referring now to FIG. 34, there is schematically illustrated in the form of a block diagram the eighth embodiment of the image pickup apparatus according to the present invention. The image pickup apparatus is generally indicated with a reference 90. This image pickup apparatus 90 is intended for application to a single-image sensing device color camera. Note that also this embodiment will be described hereinbelow supposing that input signals to various blocks of the image pickup apparatus 70 are time-series data of pixels acquired by scanning a two-dimensional digital image horizontally and then vertically and a pixel corresponding to a position (i, j) on the image is represented as p (i, j), as shown in FIG. 12.

As shown in FIG. 34, the image pickup apparatus 90 includes an image sensor 91, YC separators 92a and 92b, an image synthesizer 93, a color synthesizer 94, a dynamic range compressor 95, delayers 96a and 96b, a color compressor 97, a color compensator 98, delayers 99a and 99b, a color compensator 100, and a YC mixer 101.

Similar to the aforementioned image sensor 71, the image sensor 91 consists of an image sensing device (not shown) such as CCD and a color filter disposed on the front of the image sensing device. The color filter a color layout as shown in FIG. 7 for example. The image sensor 91 will provide an output signal in which a frequency-modulated color signal is superposed on a brightness signal as shown in FIG. 8. The image sensor 91 has the exposure controlled by an electronic shutter or the like (not shown) to provide a long exposure time image xL (i, j) acquired by exposure for a long time to the YC separator 92a provided downstream thereof, and a short exposure time image xS (i, j) acquired by exposure for a short time to the YC separator 92b also provided downstream thereof.

Similarly to the aforementioned YC separators 72a and 72b, the YC separators 92a and 92b separate an image supplied from the image sensor 91 into a brightness signal and color signal with the aid of a low-pass filter (not shown). More specifically, the YC separator 92a separates the long-exposure time image xL (i, j) supplied from the image sensor 91 into a brightness signal yL (i, j) and color signal cL (i, j) on the basis of the aforementioned equation (5), while the YC separator 92b separates the short-exposure time image xS (i, j) supplied from the image sensor 91 into a brightness signal yS (i, j) and color signal cS (i, j) in a similar manner.

The image synthesizer 93 synthesizes, by the aforementioned variety of synthesizing processes, the two brightness signals yL (i, j) and yS (i, j) separated by the YC separators 92a and 92b to produce a single synthetic brightness signal y' (i, j) whose dynamic range is wide.

The color synthesizer 94 receives the color signals cL (i, j) and cS (i, j) separated by the YC separators 92a and 92b and also the brightness signal yL (i, j) from the YC separator 92a, and synthesizes the two compensated color signals cL (i, j) and cS (i, j) referring to the brightness signal yL (i, j) to produce a synthetic color signal c' (i, j).

The dynamic range compressor 95 compresses the dynamic range of the synthetic brightness signal y' (i, j) by the aforementioned variety of compressing processes to produce a compressed brightness signal y" (i, j). It provides the compressed brightness signal y" (i, j) to the level compensator 98 provided downstream thereof and also to the color compressor 97 and delayer 99a.

The delayer 96a delays the synthetic brightness signal y' (i, j) from the image synthesizer 93 a necessary time for the dynamic range compressor 95 to compress the dynamic range of the synthetic brightness signal, and then provides it to the color compressor 97.

The delayer 96b delays the synthetic color signal c' (i, j) from the color synthesizer 94 a necessary time for the dynamic range compressor 95 to compress the dynamic range of the synthetic brightness signal, and then provides it to the color compressor 97.

The color compressor 97 compresses the synthetic color signal c' (i, j) by the aforementioned variety of compressing processes to produce a compressed color signal c" (i, j) and provides it to the delayer 99b provided downstream thereof.

The level compensator 98 compensates the level of the compressed brightness signal y" (i, j) from the dynamic range compressor 95. The level compensator 98 is constructed similarly to any of the level compensators included in the aforementioned third and sixth embodiments, and thus will not further be described herein. The level compensator 98 compensates the level of the compressed brightness signal y" (i, j) to produce a compensated compressed brightness signal Y'" (i, j).

The delayer 99a is supplied with the compressed brightness signal y" (i, j) from the dynamic range compressor 95 and delays the signal a time required from the level compensator 98 to compensate the signal level. Then it provides the delayed compressed brightness signal y" (i, j) to the color compensator 100 provided downstream thereof.

The delayer 99b is supplied with the compressed color signal c" (i, j) from the color compressor 97 and delays the signal a time required from the level compensator 98 to compensate the signal level. Then it provides the delayed compressed color signal y" (i, j) to the color compensator 100 provided downstream thereof.

The color compensator 100 will compensate the compressed color signal c" (i, j) as given by the following equation (14) to produce a compensated compressed color signal c'" (i, j):

$$c'''(i, j) = \frac{y'''(i, j)}{y''(i, j)} \times c''(i, j) \qquad (14)$$

The YC mixer 101 is provided to modulate the frequency of the compensated compressed color signal c'" (i, j) from the color compensator 100 on the basis of the following equations (15), and add to this frequency-modulated signal the compensated compressed brightness signal y'" (i, j) from the level compensator 98 to produce a mixed signal x" (i, j), and delivers it to outside.

$$x''(i, j) = y'''(i, j) + v_i \times c'''(i, j) \qquad (15)$$

$$v_i \begin{cases} 1 & \ldots i : \text{even} \\ -1 & \ldots i : \text{odd} \end{cases}$$

Figure 35:
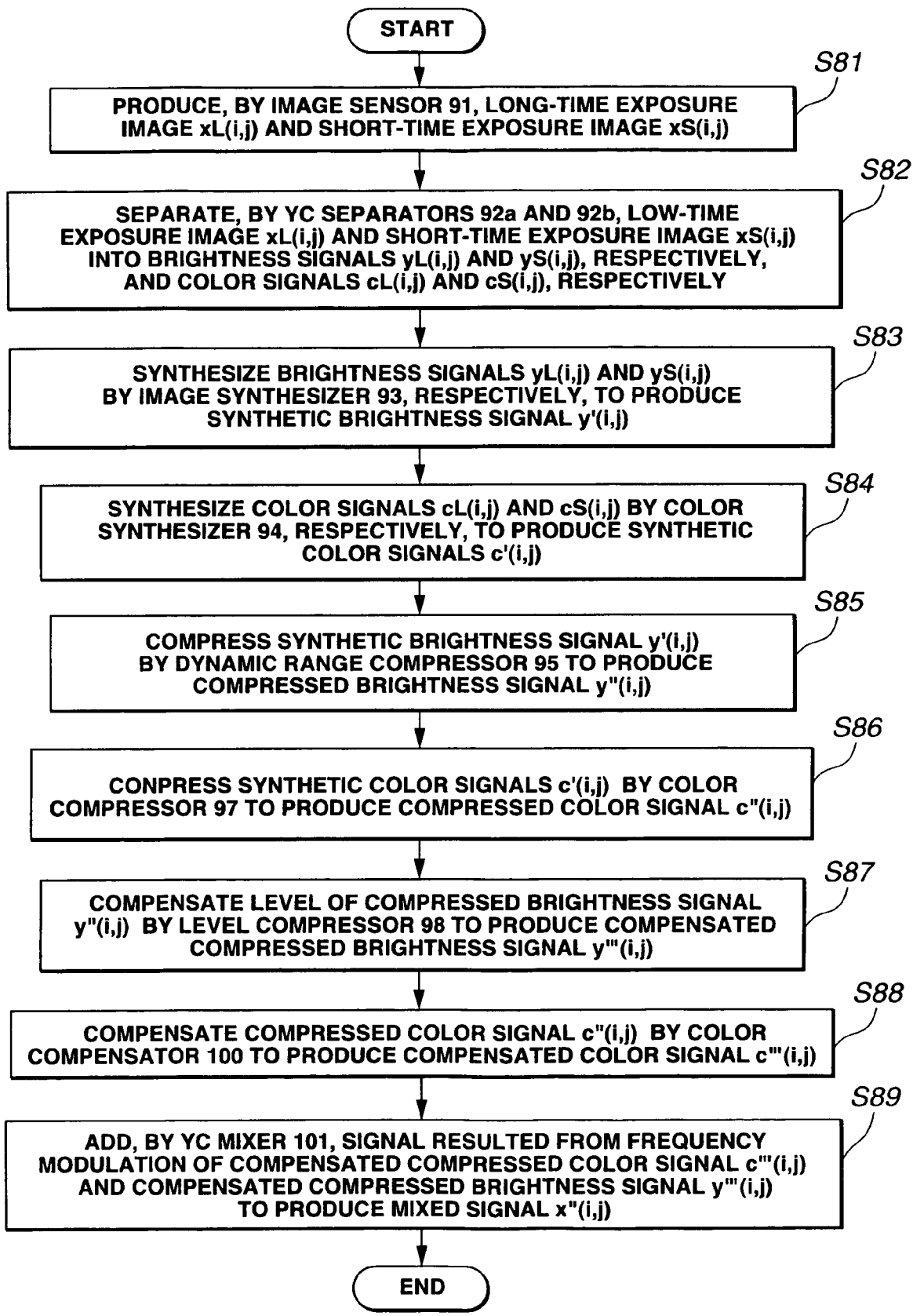
FIG. 35 is a flow chart of a series of operations effected in the image pickup apparatus in FIG. 34.

The image pickup apparatus 90 constructed as in the above effects a series of operations as shown in FIG. 35.

First at step S81, the image pickup apparatus 90 produces, by means of the image sensor 91, produces the long-exposure time image xL (i, j) and short-exposure time image xS (i, j) and provides them to the YC separators 92a and 92b, respectively.

Next at step S82, the image pickup apparatus 90, by means of the YC separators 92a and 92b, separates the two images xL (i, j) and xS (i, j), respectively, into the brightness signal yL (i, j) and yS (i, j) and color signals cL (i, j) and cS (i, j), respectively. In the image pickup apparatus 90, the brightness signals yL (i, j) and yS (i, j) are supplied to the image synthesizer 93 provided downstream thereof. Also in the image pickup apparatus 90, the brightness signal yL (i, j) is supplied to the color synthesizer 94 provided downstream thereof. Further in the image pickup apparatus 90, the color signals cL (i, j) and cS (i, j) are supplied to the color synthesizer 94 provided downstream of the image synthesizer.

Next at step S83, the image pickup apparatus 90 synthesizes, by means of the image synthesizer 93, the brightness signals yL (i, j) and yS (i, j) by the aforementioned variety of synthesizing processes to produce one synthetic brightness signal y' (i, j) having a wide dynamic range, and provides it to the dynamic range compressor 95 and delayer 96a provided downstream of the image synthesizer.

Also at step S84, the image pickup apparatus 90 synthesizes, by means of the color synthesizer 94, the compensated color signals cL (i, j) and cS (i, j) referring to the size of the compensated brightness signal yL (i, j) acquired with many different exposures, to thereby produce the synthetic color signal c' (i, j). The synthetic color signal c' (i, j) is supplied to the delayer 96b provided downstream of the color synthesizer.

Further at step S85, the image pickup apparatus 90 compresses, by means of the dynamic range compressor 95, the dynamic range of the synthetic brightness signal y' (i, j) by the aforementioned variety of compressing processes to produce the compressed brightness signal y" (i, j), and provides it to the level compensator 98 and delayer 99a provided downstream of the dynamic range compensator 95. Also, the image pickup apparatus 90 provides the compressed brightness signal y" (i, j) to the color compressor 97 provided downstream of the dynamic range compressor.

Also at step 86, the image pickup apparatus 90 compresses, by means of the color compressor 80, the synthetic color signal c' (i, j) supplied to the color compressor 80 after having been delayed by the delayer 96b a time required for the dynamic range compressor 95 to compress the dynamic range of the synthetic brightness signal, to produce the compressed color signal c" (i, j), and provides it to the delayer 99b provided downstream of the color compressor 97. At this time, in the image pickup apparatus 90, reference is made to the compressed brightness signal y" (i, j) and the synthetic brightness signal y' (i, j) delayed by the delayer 96a the time required for the dynamic range compressor 95 to compress the dynamic range of the synthetic brightness signal, to produce the compressed color signal c" (i, j).

Next at step S87, the image pickup apparatus 90 compensates, by means of the level compensator 98, the level of the compressed brightness signal y" (i, j) to produce a compensated compressed brightness signal y'" (i, j), and provides it to the YC mixer 101 provided downstream of the level compensator. In the image pickup apparatus 90, also the compensated compressed brightness signal y'" (i, j) is supplied to the color compensator 100 provided downstream of the level compensator.

Further at step S88, the image pickup apparatus 90 compensates, by means of the color compensator 100, the compressed color signal c" (i, j) supplied to the color compensator 100 after having been delayed by the delayer 99b the time required for the level compensator 98 to compensate the compressed brightness signal, to produce a compensated compressed color signal c''' (i, j). At this time, in the image pickup apparatus 90, the compensation is made by reference to the compensated compressed signal y''' (i, j) and the compressed brightness signal y'' (i, j) delayed by the delayer 99a the time required for the level compensator 98 to compensate the compressed brightness signal.

Then at step S89, the image pickup apparatus 90 modulates, by means of the YC mixer 101, the frequency of the compressed color signal c''' (i, j) supplied from the color compressor 100 and adds to this frequency-modulated compressed color signal the compensated compressed brightness signal y''' (i, j) supplied from the level compensator 98, to thereby produce a mixed signal x'' (i, j). This mixed signal x'' (i, j) is delivered to the output transmission system, display apparatus, recording apparatus and the like (not shown), and here the series of operation is over.

Thus the image pickup apparatus 90 can appropriately compensate in level or color the compressed brightness signal y'' (i, j) or compressed color signal c'' (i, j) produced by the YC separation, synthesis and further compression of images xL (i, j) and xS (i, j) in which the frequency-modulated color signals cL (i, j) and cS (i, j) are superposed on the brightness signals yL (i, j) and yS (i, j), as well to reproduce a color image represented in various forms into synthetic and compressed images which appear natural in accurate colors.

Note that in the image pickup apparatus 90, the image synthesis and compression manners are not limited to those described herein but any other synthesizing and compressing methods may be used in combination, as having previously been described.

Also note that the image pickup apparatus 90 may of course be adapted to process not only two images but also more than three images acquired by means of the image sensor 91 with exposures different from each other.

Moreover, the image pickup apparatus 90 can of course produce a mixed image x'' (i, j) by processing, by applying the aforementioned series of processes, not only images acquired by exposure for different lengths of time but also images acquired by controlling the exposure in a space-shared manner, as having been described in the foregoing, and images acquired by controlling the exposure with the aid of multiple image sensing devices.

Furthermore, it is of course that the image sensor 91 may be followed by an image processor to process an input image signal from an external image sensor such as the image sensor 91.

The image pickup apparatuses having been described as the first to eighth embodiments of the present invention in the foregoing, can produce an image in which flare components included in a captured image or an input image are well balanced.

Note that the first to eighth embodiments of the image pickup apparatus are illustrated and described just as examples for implementation of the present invention and the present invention is not limited only to these embodiments. In addition to the constructions of the first to eighth embodiments of the image pickup apparatus having been described in the foregoing, the memory capacity and signal flow in the compensator, and signals to be processes, for example, may be varied variously without departing from the spirit and scope of the present invention, whereby permitting to provide an image pickup apparatus or image processing apparatus applicable to a variety of images including all kinds of image such as monochromatic image, color image, still image and dynamic image.

As having been described in the foregoing, the image pickup method is to produce a single image excellent in gradation reproducibility from a plurality of images acquired under different exposure conditions. The method includes the steps of sensing an image under different exposure conditions to acquire a plurality of images; compensating the levels of the plurality of images on the basis of the exposure conditions under which they have been sensed respectively, to provide a plurality of compensated images; synthesizing the plurality of compensated images to produce a single synthetic image having a wide dynamic range; and compressing the synthetic image to an extent depending upon the performance of its output destination to produce a compressed image.

In the above image pickup method according to the present invention, the plurality of compensated images produced at the step of image level compensation is synthesized to produce a single image, and the synthetic image is compressed to produce a single compressed image which will appear natural. The image pickup method is featured by the fact that the flare components in the plurality of images are well balanced to enable an image processing less influenced by the flare components, thus permitting to produce a compressed image appearing more natural.

Also the image pickup method according to the present invention is to produce a single image excellent in gradation reproducibility from a plurality of images acquired by sensing an image under different exposure conditions. The method includes the steps of sensing an image under different exposure conditions to acquire a plurality of images; synthesizing the plurality of compensated images to produce a single synthetic image having a wide dynamic range; compressing the dynamic range of the synthetic image to an extent depending upon the performance of its output destination to produce a compressed image; and compensating the level of the compressed image to provide a compensated compressed image.

In the above image pickup method, the compressed image produced through the synthesis of the plurality of images and compression of the synthetic image thus obtained is compensated to produce a single compensated compressed image appearing natural. This method is featured by the fact that the subtraction of a positive compensation amount from the low-level area permits to produce a compensated compressed image incurring less flare spots found in the compressed image.

Also the image pickup apparatus according to the present invention is adapted to produce a single image excellent in gradation reproducibility from a plurality of images acquired by sensing an image under different exposure conditions. The above apparatus includes means for sensing an image under different exposure conditions to acquire a plurality of images; means for compensating the levels of the plurality of images on the basis of the exposure conditions under which they have been sensed respectively, to provide a plurality of compensated images; means for synthesizing the plurality of compensated images to produce a single synthetic image having a wide dynamic range; and means for compressing the synthetic image to an extent depending upon the performance of its output destination to produce a compressed image.

The above image pickup apparatus synthesizes the plurality of compensated images produced by the level compensating means and compresses the synthetic image thus obtained to produce a single compressed image which appears natural. This apparatus is featured by the production of a compressed image in which flare components included in the original images are well balanced.

Also the image pickup apparatus according to the present invention is adapted to synthesize a plurality of images acquired by sensing an image under different exposure conditions to produce a single image excellent in gradation reproducibility. The apparatus includes means for sensing an image under different exposure conditions to acquire a plurality of images; means for synthesizing the plurality of compensated images to produce a single synthetic image having a wide dynamic range; means for compressing the dynamic range of the synthetic image to an extent depending upon the performance of its output destination to produce a compressed image; and means for compensating the level of the compressed image to provide a compensated compressed image.

The above image pickup apparatus compensates, by the compensating means, the compressed image produced through the synthesis of the plurality of images and compression of the synthetic image thus obtained to produce a single compensated compressed image appearing natural. This apparatus is featured by the fact that the subtraction of a positive compensation amount from the low-level area permits to produce a compensated compressed image incurring less flare spots found in the compressed image.

Also the image processing method according to the present invention is to synthesize a plurality of images acquired by sensing an image under different exposure conditions to produce a single image excellent in gradation reproducibility. This method includes the steps of sensing an image under different exposure conditions to acquire a plurality of images; compensating the levels of the plurality of images on the basis of the exposure conditions under which they have been sensed respectively, to provide a plurality of compensated images; synthesizing the plurality of compensated images to produce a single synthetic image having a wide dynamic range; and compressing the synthetic image to an extent depending upon the performance of its output destination to produce a compressed image.

In the above image processing method, the plurality of compensated images produced at the step of image level compensation is synthesized and the synthetic image thus produced is compressed to produce a single compressed image. This method is featured by that flare components included in input images are well balanced to enable an image processing incurring less influence by the flare components, thus permitting to produce a compressed image appearing more natural.

Also the image processing method according to the present invention is to synthesize a plurality of images acquired by sensing an image under different exposure conditions to produce a single image excellent in gradation reproducibility. This method includes the steps of sensing an image under different exposure conditions to acquire a plurality of images; synthesizing the plurality of compensated images to produce a single synthetic image having a wide dynamic range; compressing the dynamic range of the synthetic image to an extent depending upon the performance of its output destination to produce a compressed image; and compensating the level of the compressed image to provide a compensated compressed image.

In the above image processing method, the compressed image produced through the synthesis of the plurality of images and compression of the synthetic image thus obtained is compensated to produce a single compensated compressed image. This method is featured by the fact that the subtraction of a positive compensation amount from the low-level area permits to produce a compensated compressed image incurring less flare spots found in the compressed image.

Also the image processing apparatus according to the present invention is adapted to produce a single image excellent in gradation reproducibility from a plurality of images acquired by sensing an image under different exposure conditions. The apparatus includes means for sensing an image under different exposure conditions to acquire a plurality of images; means for compensating the levels of the plurality of images on the basis of the exposure conditions under which they have been sensed respectively, to provide a plurality of compensated images; means for synthesizing the plurality of compensated images to produce a single synthetic image having a wide dynamic range; and means for compressing the synthetic image to an extent depending upon the performance of its output destination to produce a compressed image.

The above image processing apparatus synthesizes the plurality of compensated images produced by the level compensating means and compresses the synthetic image thus obtained to produce a single compressed image which appears natural. This apparatus is featured by the production of a compressed image in which flare components included in the original images are well balanced.

Also the image processing apparatus according to the present invention is adapted to synthesize a plurality of images acquired by sensing an image under different exposure conditions to produce a single image excellent in gradation reproducibility. The apparatus includes means for sensing an image under different exposure conditions to acquire a plurality of images; means for synthesizing the plurality of compensated images to produce a single synthetic image having a wide dynamic range; means for compressing the dynamic range of the synthetic image to an extent depending upon the performance of its output destination to produce a compressed image; and means for compensating the level of the compressed image to provide a compensated compressed image.

The above image processing apparatus compensates, by the level compensating means, the compressed image produced through the synthesis of the plurality of images and compression of the synthetic image thus obtained to produce a single compensated compressed image. This apparatus is featured by the fact that flare spots found in the compressed image are minimized so that the compensated compressed image appears natural.

What is claimed is:

1. An image pickup method of synthesizing a plurality of images acquired by sensing an object under different exposure conditions to produce a single image excellent in gradation reproducibility, the method comprising the steps of:

sensing an object under different exposure conditions to acquire a plurality of images;

calculating a pixel value for each of the plurality of images;

multiplying the pixel value obtained at the calculating step by a factor set based on the exposure condition to calculate a positive value compensation amount;

compensating the levels of the plurality of images on the basis of the exposure conditions under which they have been sensed respectively, to provide a plurality of compensated images by subtracting the positive value compensation amount from each image;

said positive valued compensation amount being calculated by multiplying a level average of each image of a coefficient based on the corresponding exposure condition;

said coefficient being selected for each image based on the exposure condition of that image;

synthesizing the plurality of compensated images to produce a single synthetic image having a wide dynamic range; and compressing the synthetic image to an extent depending upon the performance of its output destination to produce a compressed image.

2. The method as set forth in claim 1, further comprising the steps of:

calculating a mean pixel value of each of the plurality of images; and multiplying the mean pixel value obtained at the mean calculating step by a factor set based on the exposure condition to calculate the positive value compensation amount.

3. The method as set forth in claim 2, further comprising the steps of:

time-smoothing the positive value obtained at the multiplying step; and subtracting the time-smoothed positive value from the pixel level of each of the plurality of images.

4. The method as set forth in claim 2, wherein the factor is set larger for the image having been sensed with a larger exposure at the image sensing step.

5. The method as set forth in claim 1, further comprising the steps of:

filtering the signal of each of the plurality of images by a predetermined low-pass filter; and multiplying an output obtained at the filtering step by a factor set based on the exposure condition under which the image has been sensed to calculate the positive value compensation amount.

6. The method as set forth in claim 5, further comprising the steps of:

time-smoothing the positive value obtained at the multiplying step; and subtracting, at the subtracting step, the positive value obtained at the time-smoothing step from the pixel level of each of the plurality of images.

7. The method as set forth in claim 5, wherein the factor is set larger for the image having been sensed with a larger exposure at the image sensing step.

8. The method as set forth in claim 1, wherein each of the plurality of images acquired at the image sensing step is an image signal in which a frequency-modulated color signal is superposed on a brightness signal, the method further comprising the step of separating the image signal into the brightness and color signals; and the brightness signal and color signal separated at the signal separating step being compensated at the level compensating step to produce a compensated brightness signal and a compensated color signal, respectively;

the compensated brightness and color signals being synthesized at the image synthesizing step to produce a synthetic brightness signal and a synthetic color signal, respectively; wherein a compensation amount is calculated based on the brightness signal separated at the signal separating step the level of brightness signal is compensated with the compensation amount to produce a compensated brightness signal; and the compensated color signal is produced based on the compensated brightness signal; and the synthetic brightness and color signals being compressed at the image compressing step to produce a compressed brightness signal and a compressed color signal, respectively.

9. The method as set forth in claim 8, further comprising the step of mixing the compressed brightness and color signals.

10. An image pickup apparatus adapted to produce a single image excellent in gradation reproducibility from a plurality of images acquired by sensing an object under different exposure conditions, the apparatus comprising:

means for sensing an object under different exposure conditions to acquire a plurality of images;

means for calculating a pixel value for each of the plurality of images;

means for multiplying the pixel value obtained at the calculating step by a factor set based on the exposure condition to calculate a positive value compensation amount;

means for compensating the levels of the plurality of images on the basis of the exposure conditions under which they have been sensed respectively, to provide a plurality of compensated images by subtracting the positive value compensation amount from each image;

said positive valued compensation amount being calculated by multiplying a level average of each image of a coefficient based on the corresponding exposure condition;

said coefficient being selected for each image based on the exposure condition of that image;

means for synthesizing the plurality of compensated images to produce a single synthetic image having a wide dynamic range; and means for compressing the synthetic image to an extent depending upon the performance of its output destination to produce a compressed image.

11. The apparatus as set forth in claim 10, wherein the level compensating means comprises:

means for calculating a mean pixel value of each of the plurality of images; and means for multiplying the mean pixel value provided by the mean calculating means by a factor set based on the exposure condition to calculate the positive value compensation amount.

12. The apparatus as set forth in claim 11, wherein the level compensating means comprises:

means for time-smoothing the positive value provided by multiplying means; and means for subtracting the time-smoothed positive value from the pixel level of each of the plurality of images.

13. The method as set forth in claim 11, wherein the factor is set larger for the image having been sensed with a larger exposure by the image sensing means.

14. The apparatus as set forth in claim 10, wherein the level compensating means comprises:

means for allowing to pass the signal of each of the plurality of images through a predetermined low-pass filter; and means for multiplying an output of the signal filtering means by a factor set based on the exposure condition under which the image has been sensed to calculate the positive value compensation amount.

15. The apparatus as set forth in claim 14, wherein the level compensating means comprises means for time-smoothing time positive value provided by the multiplying means;

the subtracting means subtracting the time-smoothed positive value from the pixel level of each of the plurality of images.

16. The apparatus as set forth in claim 14, wherein the factor is set larger for the image having been sensed with a larger exposure by the image sensing means.

17. The apparatus as set forth in claim 10, wherein the image sensing means is adapted to output an image signal in which a frequency-modulated color signal is superposed on a brightness signal, the apparatus further comprising means for separating the image signal into the brightness and color signals; and the level compensating means compensating the brightness signal and color signal separated by the signal separating means to produce a compensated brightness signal and a compensated color signal, respectively; wherein:

a compensation amount is calculated based on the brightness signal separated at the signal separating step:

the level of brightness signal is compensated with the compensation amount to produce a compensated brightness signal; and the compensated color signal is produced based on the compensated brightness signal;

the signal synthesizing means synthesizing the compensated brightness and color signals to produce a synthetic brightness signal and a synthetic color signal, respectively; and the image compressing means the synthetic brightness and color signals to produce a compressed brightness signal and a compressed color signal, respectively.

18. The method as set forth in claim 17, further comprising means for mixing the compressed brightness and color signals.

19. An image processing method of synthesizing a plurality of input images acquired by sensing an object under different exposure conditions to produce a single image excellent in gradation reproducibility, the method comprising the steps of:

receiving a plurality of images acquired by sensing an object under different exposure conditions and compensating the levels of the plurality of input images on the basis of the exposure conditions under which they have been sensed respectively, to provide a plurality of compensated images by subtracting a positive value compensation amount from each image;

said positive valued compensation amount being calculated by multiplying a level average of each image by a coefficient based on the corresponding exposure condition;

said coefficient being selected for each image based on the exposure condition of that image;

calculating a pixel value for each of the plurality of images;

multiplying the pixel value obtained at the calculating step by a factor set based on the exposure condition to calculate the positive value compensation amount;

synthesizing the plurality of compensated images to produce a single synthetic image having a wide dynamic range; and compressing the synthetic image to an extent depending upon the performance of its output destination to produce a compressed image.

20. The method as set forth in claim 19, further comprising the steps of:

calculating a mean pixel value of each of the plurality of input images; and multiplying the mean pixel value obtained at the mean calculating step by a factor set based on the exposure condition to calculate the positive value compensation amount.

21. The method as set forth in claim 20, further comprising the steps of:

time-smoothing the positive value obtained at the multiplying step; and subtracting the time-smoothed positive value from the pixel level of each of the plurality of input images.

22. The method as set forth in claim 20, wherein the factor is set larger for the input image having been sensed with a larger exposure at the image sensing step.

23. The method as set forth in claim 19, further comprising the steps of:

filtering the signal of each of the plurality of input images by a predetermined low-pass filter; and multiplying an output obtained at the filtering step by a factor set based on the exposure condition under which the image has been sensed to calculate the positive value compensation amount.

24. The method as set forth in claim 23, further comprising the steps of:

time-smoothing the positive value obtained at the multiplying step; and subtracting, at the subtracting step, the positive value obtained at the time-smoothing step from the pixel level of each of the plurality of input images.

25. The method as set forth in claim 23, wherein the factor is set larger for the input image having been sensed with a larger exposure at the image sensing step.

26. The method as set forth in claim 19, wherein each of the plurality of input images acquired at the image sensing step is an image signal in which a frequency-modulated color signal is superposed on a brightness signal, the method further comprising the step of separating the image signal into the brightness and color signals; and the brightness signal and color signal separated at the signal separating step being compensated at the level compensating step to produce a compensated brightness signal and a compensated color signal, respectively;

the compensated brightness and color signals being synthesized at the image synthesizing step to produce a synthetic brightness signal and a synthetic color signal, respectively; wherein a compensation amount is calculated based on the brightness signal separated at the signal separating step the level of brightness signal is compensated with the compensation amount to produce a compensated brightness signal; and the compensated color signal is produced based on the compensated brightness signal; and the synthetic brightness and color signals being compressed at the image compressing step to produce a compressed brightness signal and a compressed color signal, respectively.

27. The method as set forth in claim 26, further comprising the step of mixing the compressed brightness and color signals.

28. An image processing apparatus adapted to produce a single image excellent in gradation reproducibility from a plurality of input images acquired by sensing an object under different exposure conditions, the apparatus comprising:
    means for receiving a plurality of input images acquired by sensing an object under different exposure conditions and compensating the levels of the plurality of input images on the basis of the exposure conditions under which they have been sensed respectively, to provide a plurality of compensated images by subtracting a positive valued compensation amount for each image;
    said positive valued compensation amount being calculated by multiplying a level average of each image by a coefficient based on the corresponding exposure condition;
    said coefficient being selected for each image based on the exposure condition of that image;
    means for calculating a pixel value for each of the plurality of images;
    means for multiplying the pixel value obtained at the calculating step by a factor set based on the exposure condition to calculate the positive value compensation amount;
    means for synthesizing the plurality of compensated images to produce a single synthetic image having a wide dynamic range; and
    means for compressing the synthetic image to an extent depending upon the performance of its output destination to produce a compressed image.

29. The apparatus as set forth in claim 28, wherein the level compensating means comprises:
    means for calculating a mean pixel value of each of the plurality of input images; and
    means for multiplying the mean pixel value provided by the mean calculating means by a factor set based on the exposure condition to calculate the positive value compensation amount.

30. The apparatus as set forth in claim 29, wherein the level compensating means comprises:
    means for time-smoothing the positive value provided by the multiplying means; and
    means for subtracting the time-smoothed positive value from the pixel level of each of the plurality of input images.

31. The apparatus as set forth in claim 29, wherein the factor is set larger for the input image having been sensed with a larger exposure by the image sensing means.

32. The apparatus as set forth in claim 28, wherein the level compensating means comprises:
    means for filtering the signal of each of the plurality of input images by a predetermined low-pass filter; and
    means for multiplying an output of the signal filtering means by a factor set based on the exposure condition under which the image has been sensed to calculate the positive value compensation amount.

33. The apparatus as set forth in claim 32, wherein the level compensating means comprises means for time-smoothing the positive value provided by the multiplying means;
    the subtracting means subtracting the time-smoothed positive value from the pixel level of each of the plurality of input images.

34. The apparatus as set forth in claim 32, wherein the factor is set larger for the input image having been sensed with a larger exposure by the image sensing means.

35. The apparatus as set forth in claim 28, wherein the image sensing means is adapted to output an image signal in which a frequency-modulated color signal is superposed on a brightness signal, the apparatus further comprising means for separating the image signal into the brightness and color signals; and
    the level compensating means compensating the brightness signal and color signal separated by the signal separating means to produce a compensated brightness signal and a compensated color signal, respectively; wherein:
        a compensation amount is calculated based on the brightness signal separated at the signal separating step
        the level of brightness signal is compensated with the compensation amount to produce a compensated brightness signal; and
        the compensated color signal is produced based on the compensated brightness signal; and
    the signal synthesizing means synthesizing the compensated brightness and color signals to produce a synthetic brightness signal and a synthetic color signal, respectively; and
    the image compressing means the synthetic brightness and color signals to produce a compressed brightness signal and a compressed color signal, respectively.

36. The apparatus as set forth in claim 35, further comprising means for mixing the compressed brightness and color signals.

37. An image pickup apparatus adapted to synthesize a plurality of images acquired by sensing an object under different exposure conditions to produce a single image excellent in gradation and reproducibility, the apparatus comprising:
    means for sensing an object under different exposure conditions to acquire a plurality of images;
    means for calculating a pixel value for each of the plurality of images;
    means for multiplying the pixel value obtained at the calculating step by a factor set based on the exposure condition to calculate a positive value compensation amount;
    means for synthesizing plural images to produce a single synthetic image having a wide dynamic range;
    means for compressing either the synthetic image or the dynamic range of the synthetic image to an extent depending upon the performance of its output destination to produce a compressed image; and
    means for compensating the level of images supposed thereto to provide compensated images, whereby said compensating means is supplied with either (a) the images acquired by said sensing means to compensate the levels of said images on the basis of the exposure conditions under which said images have been sensed, respectively, by subtracting the positive valued compensation amount from each image;
    said positive valued compensation amount being calculated by multiplying a level average of each image by a coefficient based on the corresponding exposure condition, and said synthesizing means is supplied with the provided compensated images, or (b) the compressed image and said synthesizing means is supplied with the acquired uncompensated images;
    said coefficient being selected for each image based on the exposure condition of that image.

* * * * *